(12) United States Patent
Kishi et al.

(10) Patent No.: US 10,997,410 B2
(45) Date of Patent: May 4, 2021

(54) INFORMATION PROCESSING DEVICE AND INFORMATION PROCESSING SYSTEM

(71) Applicants: Hidenobu Kishi, Kanagawa (JP); Nobuyuki Kishi, Tokyo (JP); Mana Akaike, Tokyo (JP)

(72) Inventors: Hidenobu Kishi, Kanagawa (JP); Nobuyuki Kishi, Tokyo (JP); Mana Akaike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 65 days.

(21) Appl. No.: 16/437,143

(22) Filed: Jun. 11, 2019

(65) Prior Publication Data
US 2020/0074172 A1 Mar. 5, 2020

(30) Foreign Application Priority Data

Aug. 31, 2018 (JP) .............................. JP2018-162995
May 13, 2019 (JP) .............................. JP2019-090835

(51) Int. Cl.
*G06T 7/20* (2017.01)
*G06K 7/14* (2006.01)
*G06K 9/00* (2006.01)

(52) U.S. Cl.
CPC ....... *G06K 9/00476* (2013.01); *G06K 7/1417* (2013.01); *G06K 9/00456* (2013.01); *G06T 7/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,122,403 | A * | 9/2000 | Rhoads | G06Q 20/341 382/233 |
| 6,763,373 | B2 * | 7/2004 | Shiigi | G06Q 10/107 709/206 |
| 7,047,241 | B1 * | 5/2006 | Erickson | G06F 21/10 |
| 7,564,992 | B2 * | 7/2009 | Rhoads | H04N 1/32288 382/100 |
| 7,664,321 | B2 * | 2/2010 | Fukuoka | H04N 1/00363 382/181 |
| 2003/0031341 | A1 * | 2/2003 | Rhoads | G07D 7/0032 382/100 |
| 2005/0015370 | A1 * | 1/2005 | Stavely | G06F 16/532 |

(Continued)

FOREIGN PATENT DOCUMENTS

| | | |
|---|---|---|
| JP | 2014-010723 | 1/2014 |
| JP | 2016-177595 | 10/2016 |

*Primary Examiner* — Omar S Ismail
(74) *Attorney, Agent, or Firm* — Oblon, McClelland, Maier & Neustadt, L.L.P.

(57) ABSTRACT

An information processing device includes circuitry to generate content based on image data of an original image drawn on a medium. The content is available for use with a terminal device. The circuitry further acquires identification information uniquely identifying the original image. The circuitry further registers the generated content and the acquired identification information, in association with each other. The content and the identification information are registered in association with each other, to an information acquisition destination from which the terminal device is to acquire information based on the identification information.

13 Claims, 14 Drawing Sheets

(56) References Cited

U.S. PATENT DOCUMENTS

| | | | |
|---|---|---|---|
| 2007/0199031 A1* | 8/2007 | Nemirofsky | H04N 21/4828 |
| | | | 725/88 |
| 2010/0091139 A1* | 4/2010 | Sako | H04N 1/3871 |
| | | | 348/231.99 |
| 2011/0282906 A1* | 11/2011 | Wong | G06F 16/7867 |
| | | | 707/780 |
| 2014/0006387 A1 | 1/2014 | Kishi et al. | |
| 2015/0124084 A1* | 5/2015 | Ikenoue | A63F 13/655 |
| | | | 348/135 |
| 2016/0063678 A1* | 3/2016 | Jeong | G06T 3/4092 |
| | | | 345/660 |
| 2016/0240004 A1* | 8/2016 | Ur | G06T 19/20 |
| 2017/0244928 A1* | 8/2017 | Miyajima | H04N 21/23418 |
| 2017/0323449 A1* | 11/2017 | Aonuma | G06T 7/20 |
| 2018/0047209 A1* | 2/2018 | Funami | H04N 1/19594 |
| 2018/0130258 A1* | 5/2018 | Yamauchi | G06T 11/60 |
| 2019/0050427 A1* | 2/2019 | Wiesel | G06K 9/3241 |

* cited by examiner

INFORMATION PROCESSING DEVICE AND INFORMATION PROCESSING SYSTEM

CROSS-REFERENCE TO RELATED APPLICATIONS

This patent application is based on and claims priority pursuant to 35 U.S.C. § 119(a) to Japanese Patent Application Nos. 2018-162995, filed on Aug. 31, 2018, and 2019-090835, filed on May 13, 2019, in the Japan Patent Office, the entire disclosures of which are hereby incorporated by reference herein.

BACKGROUND

Technical Field

Embodiments of the present disclosure relate to an information processing device and an information processing system.

Related Art

There is a known system that reads a picture drawn by an event participant in an event site as image data, gives (applies) motion to an image of the picture, and displays the image on a display device in the event site. With the system, images of pictures created (drawn) by a plurality of event participants can be made to appear one after another in a display area, and each image of the picture can be moved around in the same display area. The system allows the event participants to enjoy the event site more and is expected to attract customers, and thus, the system is used for sales promotion.

Such a known system applies motion to the image of the picture based on a feature amount extracted from the image of the picture, which is, for example, a picture of a creature (living matter), and causes the image of the picture to move freely in a background (e.g., land, sea, sky) image, and projects the image of the picture and the background image to be displayed by a projector.

SUMMARY

An exemplary embodiment of the present disclosure includes an information processing device including circuitry to generate content based on image data of an original image drawn on a medium. The content is available for use with a terminal device. The circuitry further acquires identification information uniquely identifying the original image. The circuitry further registers the generated content and the acquired identification information, in association with each other. The content and the identification information are registered in association with each other, to an information acquisition destination from which the terminal device is to acquire information based on the identification information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
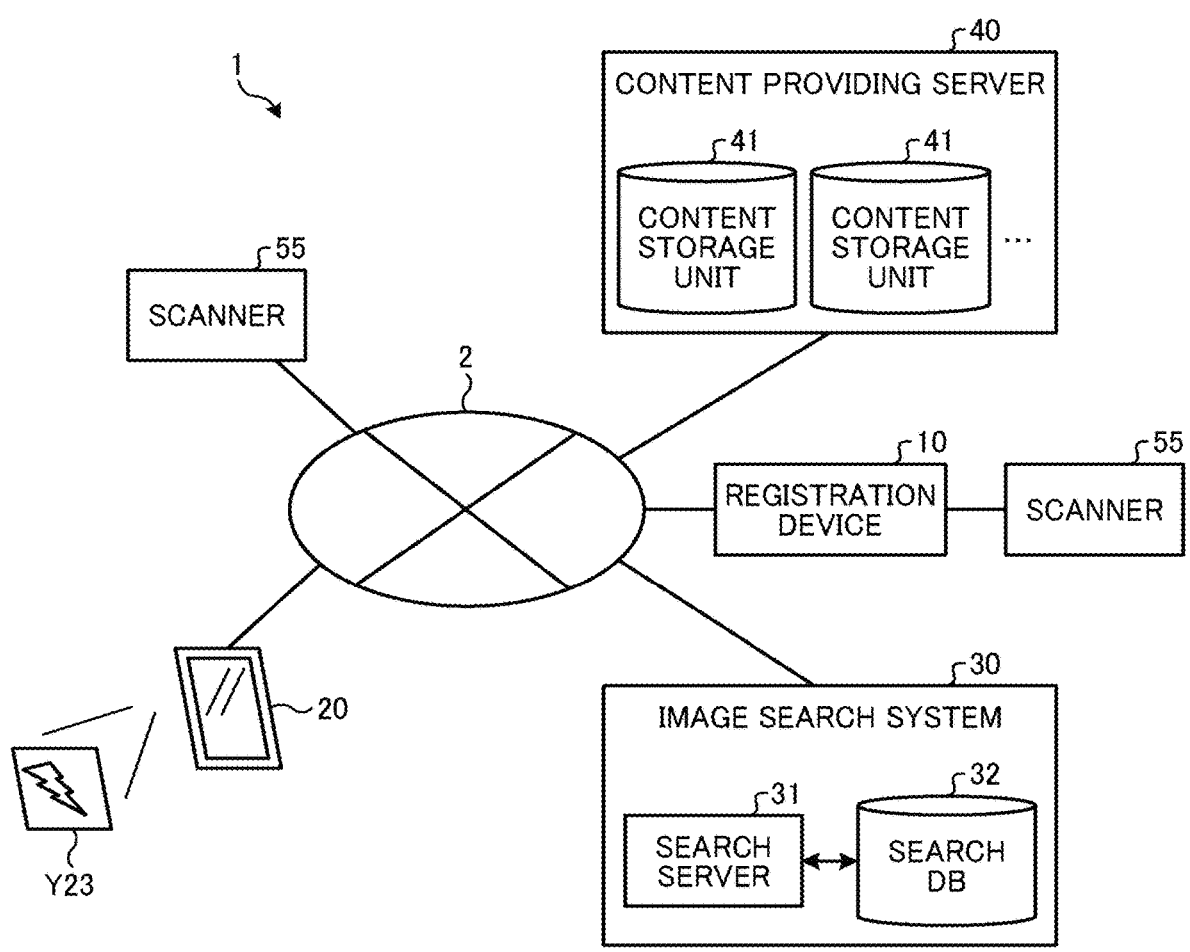
FIG. 1 is a diagram illustrating an example of a configuration of an information processing system according to an embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of an information processing device, an information processing system, a method of processing information, and a recording medium storing a program are described in detail with reference to the drawings.

Embodiments

In the following, a mechanism, a configuration of an apparatus, and a method for providing an original picture displayable with an image display system to a terminal device owned by a user are described as exemplary embodiments. As an example, a case in which a picture is created (drawn) on a designated sheet of paper in an event site by a visitor, who visits an event, such as an exhibition, and content of the picture is provided to a terminal device owned by a user, is described. Hereinafter, the visitor is also referred to as an "event participant" or a "participant". The event participant may be the same person with the user. Here, the picture drawn on the sheet (drawn picture) includes a painting. In addition, an "original picture drawn on a medium" or "original pictures each of which is drawn on one of a plurality of media" according to the present embodiment is not limited to a picture drawn by the event participant but includes a picture drawn by a staff, or the like. In addition, the picture is not limited to the drawn picture, but may be a picture prepared in advance, a picture that is printed on the sheet, or the like. The "sheet" of paper is an example of a medium. The "medium" according to the present embodiment is not limited to the sheet of paper, but may be, for example, a medium for electronically drawing a picture or a medium for magnetically drawing a picture, as long as the original picture is displayable.

FIG. 1 is a diagram illustrating an example of a configuration of an information processing system according to the present embodiment. Referring to FIG. 1, an information processing system 1 includes, for example, a registration device 10, a terminal device 20, an image search system 30, a content providing server 40, which serves as a "content server", and at least one image reading apparatus (scanner) 55. The above-mentioned devices, apparatuses, servers, or the like are communicatively connected to each other via a network 2, such as the Internet. Note that the scanner 55 may be used by being directly connected to the registration device 10 without using the network 2, as illustrated in FIG. 1. As an example of the network 2, a local area network (LAN), a virtual private network (VPN), the Internet, or the like is used. In addition, to the network 2, an application providing server, an external service providing server, a social networking service (SNS) server, or the like, may be appropriately and communicably connected. Note that the information processing system according to the embodiments is not limited to the above-described configuration and may be provided as a system including at least two or more of the devices, the apparatuses, the servers, or the like of the information processing system 1. In addition, in the present embodiment, the image search system 30 and the content providing server 40 are separately provided on the network 2, however, the embodiments are not limited thereto and the image search system 30 and the content providing server 40 may be collectively provided as one unit. In the following description, the information processing system 1 is described as having the configuration that includes the registration device 10, the terminal device 20, the image search system 30, the content providing server 40, and the at least one scanner 55.

Each of the registration device 10, the terminal device 20, the image search system 30, and the content providing server 40 includes an information processing device having a computer configuration. In addition, a part or all of the operation (i.e., the functions or the processing) of each of the registration device 10, the terminal device 20, the image search system 30, and the content providing server 40, may be implemented by dedicated hardware.

The registration device 10 generates content that is to be used (available) by a dedicated application of the terminal device 20 based on an original picture (original source, original image, source image), and registers the content to the content providing server 40 in association with management information unique to the content (unique management information). In the exemplary embodiment, a picture drawn by the participant is used as the original picture, and the scanner 55 reads an image including the picture (image of the picture). The registration device 10 generates content to be used (available) by the dedicated application, which is installed on the terminal device 20, based on image data of the picture (i.e., the read image). A registration destination of the content is identified by, for example, the unique identification information given to (e.g., printed on) a sheet of paper on which the picture is drawn. The registration device 10 automatically uploads the content to the content providing server 40 via the network 2 so that the registration device 10 registers the content to the content providing server 40. Note that the registration from the registration device 10 via the network 2 may be performed through a dedicated line, or may be performed not only by a wired communication but also by a wireless communication. In addition, the uploading may be performed by manually operating instead of automatically operating, or the uploading may be performed via a portable storage medium such as a secure digital (SD) card instead of via the network 2.

The terminal device 20 is a portable terminal device, such as a tablet type computer or a smartphone. The user of the terminal device 20 is, for example, the event participant or a member of a family if the event participant is a child. The terminal device 20 is installed with the dedicated application. The dedicated application is downloaded and installed from a web site (e.g., an application providing server). In addition, the dedicated application may be provided by using not only the web site, but also by using a portable storage medium, such as a compact disc read only memory (CD-ROM).

When the dedicated application is activated, the terminal device 20 captures an image of a printed matter, or the like, by a camera function to acquire image-related information (hereinafter, also referred to as related information) that is related to the captured image, which is an image being displayed on a screen of the terminal device 20. More specifically, when the dedicated application is activated and the terminal device 20 captures the image of the printed matter, the dedicated application causes the terminal device 20 to connect to the Internet and transmit the captured image to the image search system 30 via the network 2. Then, upon receiving link information associated with the captured image from the image search system 30, the terminal device 20 accesses a location (storage location) where the related information is stored based on the received link information. In addition, the dedicated application launches a function (e.g., another application) that can process the related information, which is acquired by the function of the dedicated application, and the launched function or application reads the related information to be processed. The dedicated application has a module for each function. Note that each module may be provided as an independent application.

According to the present embodiment, the terminal device 20, which is owned by the event participant, receives the link information from the image search system 30 by capturing an image of an augmented reality (AR) mark (AR area Y23) provided on the sheet, which is used by the event participant to draw the picture, and then the terminal device 20 acquires, from the image search system 30, as the related information, information on the event, the content of the picture drawn by the event participant, and the like, which are saved in a link destination indicated by the link information. In the following description of the present embodiment, the content, which is registered to the content providing server 40 by the registration device 10, is used as one of the examples of the related information.

Although not specifically described in the embodiment, when the event participant captures another image of printed matter which is not related to the designated sheet (e.g., a catalog, etc.) by using the terminal device 20, the image search system 30 can also transmit link information corresponding to the image captured by the terminal device 20. In this case, the image search system 30 transmits the link information from a database corresponding to the printed matter of which the image is captured. Then, the dedicated application of the terminal device 20 acquires web information, such as a related article, from an external service providing server indicated by the link information and displays the web information on the terminal device 20.

The image search system 30 includes, for example, an image search server (search server) 31, which includes one or more information processing devices, and a search database (DB) 32 for searching for link information associated with an image. The image search server 31 searches the search DB 32 based on the image transmitted from the terminal device 20, and acquires the link information associated with the image. In the link information, information on a uniform resource identifier (URI) or the like is set. For example, a uniform resource locator (URL) indicating a location of a resource on the network 2 is set. The URL includes a URL indicating a location of a resource of web information provided by the external service providing server or a URL of the content providing server 40. In the following description, the URL is regarded as the link information unless otherwise specifically described, but the link information is not limited thereto.

Information to be searched is registered in the search DB 32 in advance, so that the image of the picture drawn in the event site becomes available for use with the application of the terminal device 20. The information to be searched is registered, for example, for each of the shops. In this description, the shop is defined as a shop or a store that organizes, or holds, the event. Each shop may hold the event in the same site (place) at the same time, or may hold the event in a different site simultaneously or on a different day. In addition, the event of each shop may be hold on a permanent basis (regularly), or may be hold on a temporary basis (temporarily).

More specifically, the AR mark of the sheet, which is to be distributed at each shop, and the link information (for example, the URL of the content providing server 40 for each shop) are registered in the search DB 32 in advance. Each shop distributes sheets for drawing a picture, which are, hereinafter referred to as drawing sheets, and each drawing sheet is given with the AR mark corresponding to the shop. The event participant can acquire the URL corresponding to the shop, which is an organizer of the event, by capturing the image of the AR mark given (attached) on the drawing sheet, which is distributed at the shop, by using the terminal device 20.

The content providing server 40 includes, for example, a content storage unit 41 that stores content to be used (available) by the application of the terminal device 20, and provides, to the terminal device 20, target content as the related information. The content providing server 40 transmits the target content to the terminal device 20 via the network 2 to provide, to the terminal device 20, the target content as the related information. More specifically, the content providing server 40 includes a transmission unit that transmits the content via a network board or the like. The content is generated by the registration device 10. The content is stored, by a storage unit, in a storage location (information acquisition destination, which is a destination from which information is to be acquired by the terminal device 20) identified by the management information associated with the content at a time of the registration. Here, as an example, the content is stored in the storage location indicated by an identification code (unique identification code) uniquely set to each shop. For example, the content is divided into a hierarchical structure of the directory, and is registered in a file path identified by the identification code set for each shop. In addition, although a plurality of content storage units 41 are described here, these are divided according to a type of the content, etc., for example. Each content storage unit 41 is accessed by a path corresponding to each content providing server 40.

The image reading apparatus (scanner) 55 is an example of a "reading unit". The image reading apparatus (scanner) 55 scans a sheet Y set at a predetermined position, and acquires an image of the sheet Y (read image). For example, the image reading apparatus 55 includes a scanner (imaging device), a placing table on which the sheet Y is placed, and a tool for fixing the scanner at a predetermined height in relation to the placing table. The sheet Y is set so as to face up on the placing table, and a front surface (front side) of the sheet Y is optically scanned, and thereby the image on the front surface of the sheet Y can be read by the scanner. The read image read by the image reading apparatus (scanner) 55 is input to the registration device 10 directly or via the network 2.

In the event site, the staff (operator) uses the scanner 55 to read the image of the picture (e.g., a painting of a creature) drawn on the sheet by the participant and to convert the image of the picture into image data, and applies motion to the image of the picture by the image display system 50 to display the picture having the motion on a display device.

Figure 2:
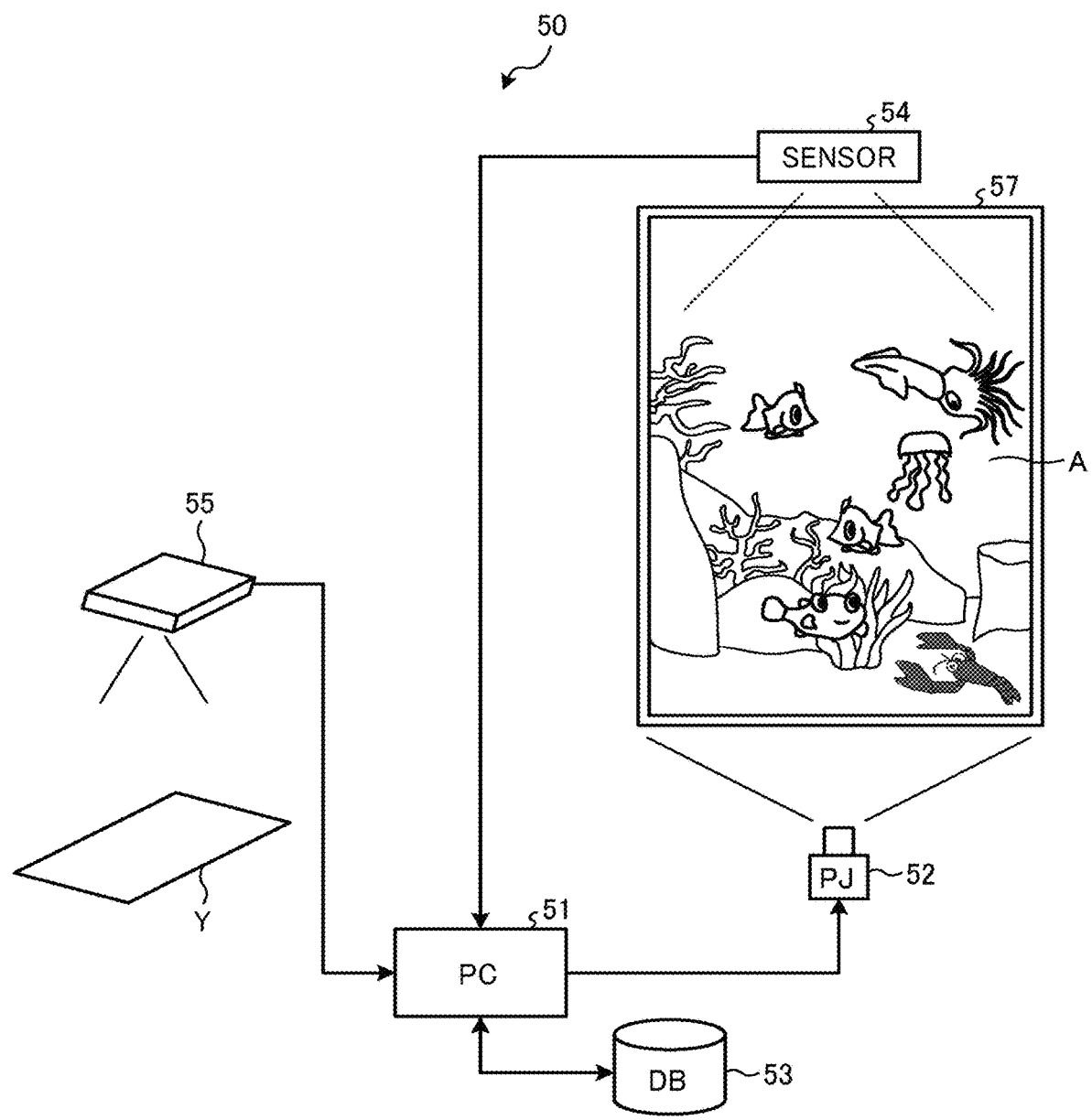
FIG. 2 is a diagram illustrating an example of a configuration of an image display system according to an embodiment of the disclosure.

FIG. 2 is a diagram illustrating an example of a configuration of the image display system 50, according to the present embodiment of the disclosure. Referring to FIG. 2, the image display system 50 includes, for example, a personal computer (PC) 51, a projector (PJ) 52, an image database (DB) 53, a sensor 54, and the image reading apparatus (scanner) 55. The image reading apparatus (scanner) 55 is, for example, the scanner 55 connected to the network 2 illustrated in FIG. 1.

The PC 51 controls the overall operation of the image display system 50. The PC 51 acquires, from the image reading apparatus (scanner) 55, a picture, which is drawn on the sheet Y by the event participant in the event site, as a read image and registers an image of the picture, which is drawn on the sheet Y, in the image DB 53. In addition, the PC 51 generates display information A in which the pictures of the images has the motion, which is three-dimensional motion given to each of the pictures of the images registered in the image DB 53. The PJ 52 projects the display information A onto a projection medium 57 according to a display signal output from the PC 51. The sensor 54 detects and outputs a person's gesture, a hand gesture, or the like, and the PC 51 updates movement or the like of each picture according to the output from the sensor 54.

FIG. 3A to FIG. 3D are examples of illustrations of layouts of the sheet(s) Y. The sheet Y is the drawing sheet, which is distributed in the event site. In FIG. 3A to FIG. 3D (FIG. 3), a layout of a front surface (front side) Y1 of the sheet Y and a layout of a back surface (back side) Y2 of the sheet Y are illustrated. The event participant draws a picture on the front side Y1, and the image reading apparatus (scanner) 55 reads an image of the front side Y1. The back side Y2 is mainly used when the user acquires the content by using the terminal device 20.

Figure 3A:
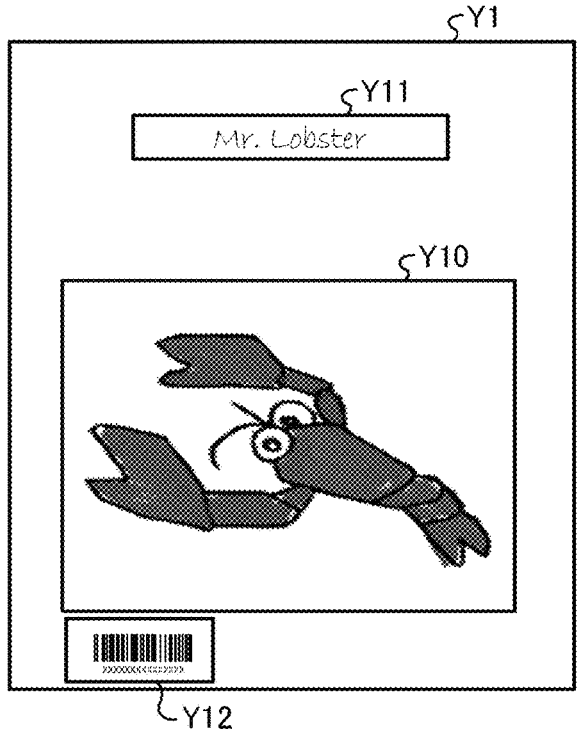
FIG. 3A to FIG. 3D (FIG. 3) are illustrations of layouts of a sheet, according to an embodiment of the disclosure.
Figure 3B:
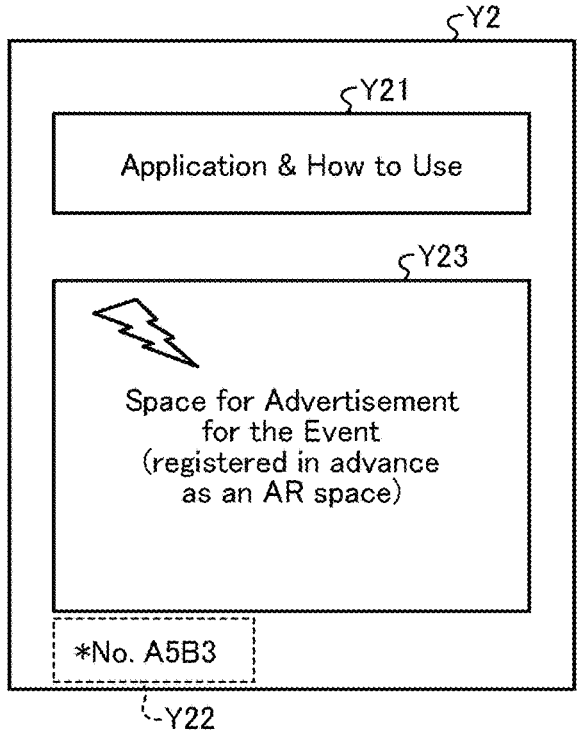

The front side Y1 includes a hand drawing area Y10 in which the event participant draws a picture. In this example, a title area Y11 for writing a title of the picture is also provided. The front side Y1 of FIG. 3A also includes an identification area Y12 in which an identification pattern that indicates the unique identification information is set. In the example of FIG. 3A, a bar code is used as an example of the identification pattern corresponding to the unique identification information.

The identification pattern may be, for example, a two-dimensional code (for example, a QR code (registered trademark)). Alternatively, the identification pattern may be an identification code including numbers, alphabets, symbols or the like. Alternatively, the identification pattern may be a marker, other than the above. In addition, the identification area Y12 may include a color code or the like. As described above, the identification information may be set appropriately in the identification area Y12. In addition, a mark for defining an orientation of the sheet or an arrangement of each area may be provided according to settings.

Figure 3C:
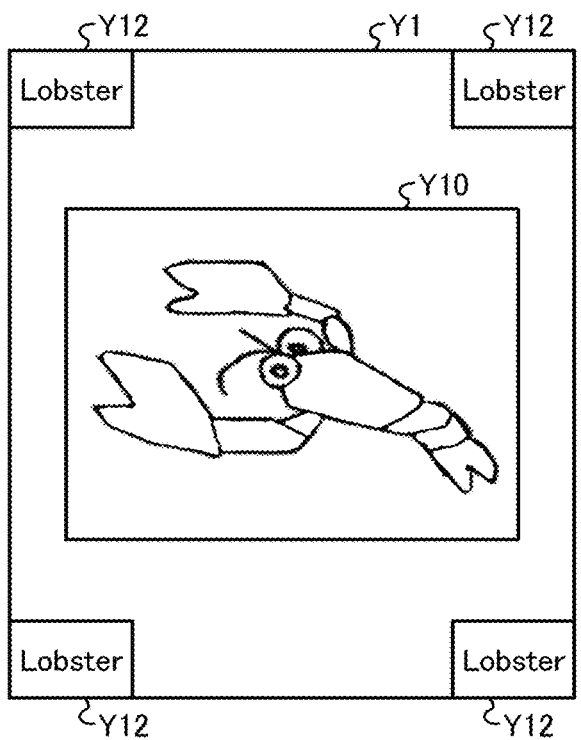
Figure 3D:
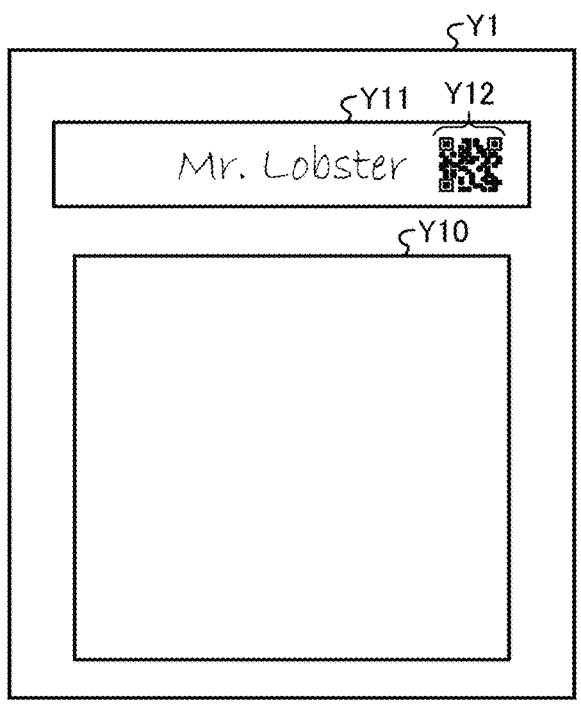

In the above example, the event participant freely draws the picture in the hand drawing area Y10, however the disclosure is not limited thereto. For example, as illustrated in FIG. 3C, a sketch (picture) is provided in the hand drawing area Y10 in advance, and the event participant may color (paint) the sketch. In addition, as for the identification area Y12, as illustrated in FIG. 3C and FIG. 3D, the same type or a similar type, or a various type of the identification information may be provided at any position on the front side Y1.

The back side Y2 includes a description area Y21 for describing how to install the dedicated application to play with (use) the picture drawn on the front side Y1 and how to use the application. In addition, the back side Y2 includes another identification area Y22 in which the same identification information as the identification pattern set in the identification area Y12 of the front side Y1 is set. In the identification area Y22, an identification code including numbers, alphabets, symbols, or the like that are human readable and can be input to the terminal device 20 by key input is set.

In addition, the back side Y2 includes the AR area Y23. The AR area Y23 includes the AR mark, which is described above. The AR mark is set arbitrary. For example, an illustration of an advertisement for the event, a text for announcing the event, or the like can be set appropriately. Information to be used as the AR mark is registered in advance in the search DB 32. The AR mark is set for each shop in a different manner. Accordingly, when the terminal device 20 captures an image of the AR mark when acquiring the content, the terminal device 20 can identify one of the shops based on the type of the AR mark. When the AR mark is common to all shops, a separate shop code is additionally required. In this case, the shop code is set appropriately, for example, in a manner that the shop code is provided separately from the identification code or that the shop code is incorporated in the identification code.

Setting the information in each area of the sheet Y is performed by printing, sticking a seal, or the like. In the following description, it is assumed that the information is printed in each area of the sheet Y.

Hardware Configuration

Figure 4:
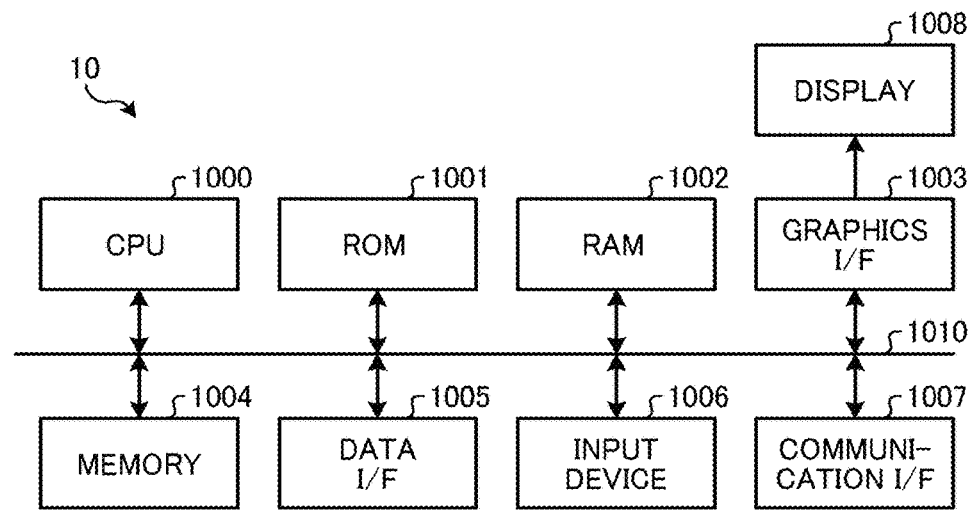
FIG. 4 is a block diagram illustrating an example of a hardware configuration of a registration device according to an embodiment of the disclosure.

FIG. 4 is a block diagram illustrating an example of a hardware configuration of the registration device 10. The registration device 10 is an information processing device on which a computer including a central processing unit (CPU), a read only memory (ROM), and a random access memory (RAM) are mounted. As illustrated in FIG. 4, the registration device 10 includes, for example, a CPU 1000, a ROM 1001, a RAM 1002 and a graphics interface (I/F) 1003 that are connected to a bus 1010. In addition, the registration device 10 includes, for example, a memory 1004, a data I/F 1005, an input device 1006, a communication OF 1007, and a display 1008 that are connected to the bus 1010.

The memory 1004 is a non-volatile storage medium capable of storing data. For example, the memory 1004 is a hard disk drive. The memory 1004 stores programs to be executed by the CPU 1000 and various data. The memory 1004 and the ROM 1001 may be provided by sharing one rewritable nonvolatile semiconductor memory or the like, for example.

The CPU 1000 controls the entire operation of the registration device 10 using the RAM 1002 as a working memory according to a program stored in the ROM 1001 and the memory 1004. The graphics I/F 1003 converts display control signals generated by the CPU 1000 into signals that are displayable with the display 1008, and outputs the converted signals to the display 1008. The display 1008 includes, for example, a liquid crystal display (LCD), and displays according to the display control signal by being driven with a signal output from the graphics I/F 1003.

The data I/F 1005 performs data input/output in relation to an external device. An interface such as a universal serial bus (USB) or Bluetooth (registered trademark) can be used as the data I/F 1005. In the description of the present embodiment, the image reading apparatus (scanner) 55 is connected to the registration device 10, and an image (read image) that is read from a sheet by the image reading apparatus (scanner) 55 is input to the registration device 10 via the data I/F 1005.

The input device 1006 receives an operator's input in relation to the registration device 10. The input device 1006 is, for example, a mouse or a keyboard. The communication I/F 1007 is a communication interface for connecting to the network 2.

Figure 5:
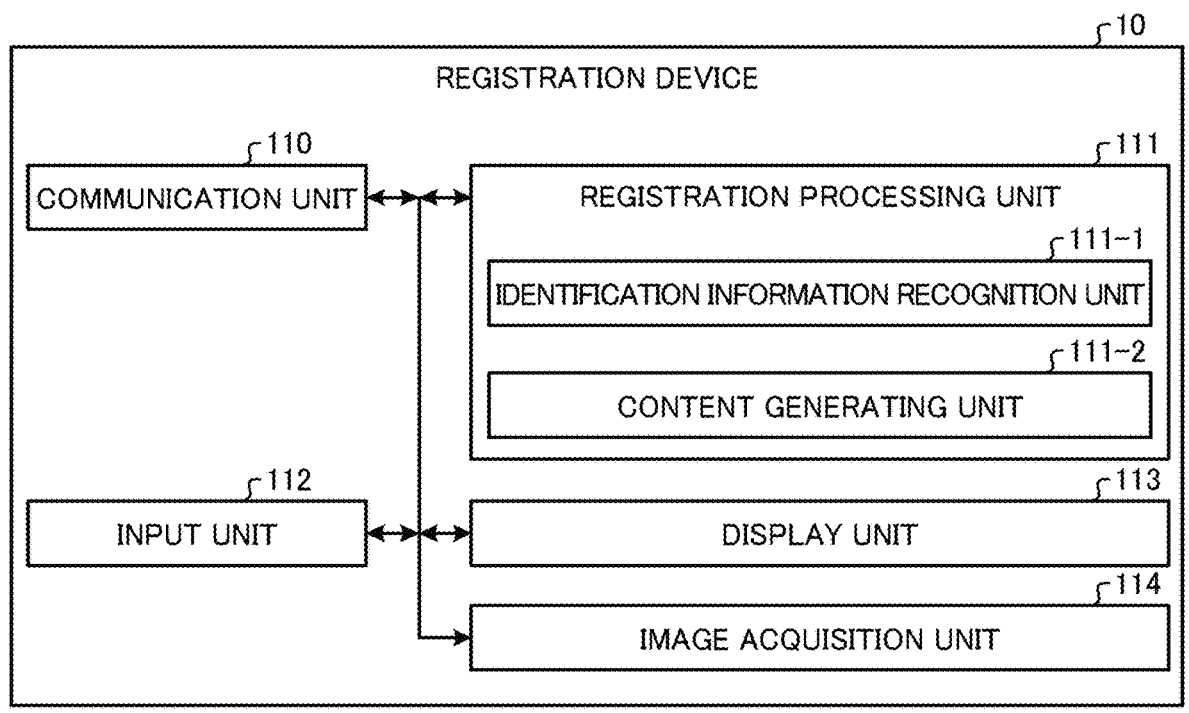
FIG. 5 is a block diagram illustrating an example of a functional configuration of a registration device according to an embodiment of the disclosure.

FIG. 5 is a block diagram illustrating an example of a functional configuration of the registration device 10 according to the present embodiment. Referring to FIG. 5, the registration device 10 includes, for example, a communication unit 110, a registration processing unit 111 (including an identification information recognition unit 111-1 and a content generating unit 111-2), an input unit 112, a display unit 113, and an image acquisition unit 114. In addition, the registration device 10 includes functions as a processing unit of the image display system 50. In the following description, main functions of the registration device 10 are described, and illustrations and a detailed description of the functions as the processing unit of the image display system 50 are omitted.

The communication unit 110, the registration processing unit 111, the input unit 112, the display unit 113, and the image acquisition unit 114 illustrated in FIG. 5 are implemented by the CPU 1000 executing a program stored in the ROM 1001 or the memory 1004. The registration processing unit 111 functions as a "registration unit".

The image acquisition unit 114 acquires an image (a read image read from a sheet) output from the image reading apparatus (scanner) 55 via the data I/F 1005 or the communication I/F 1007.

The registration processing unit 111 includes the identification information recognition unit 111-1 that functions as an "acquisition unit" and the content generating unit 111-2 that functions as a "generating unit", and registers the content by using the identification information recognition unit 111-1 and the content generating unit 111-2.

The content generating unit 111-2 generates the content by extracting the image of the picture in the hand drawing area Y10 from the image of the front side Y1 of the sheet. The content is data that is processed to be used (available) by the dedicated application of the terminal device 20. In the present embodiment, as an example, a frame picture (i.e., an original frame image designed based on a picture drawn by hand) that is an original frame used with a camera application (i.e., a frame camera) capable of capturing an image with the original frame by using the terminal device 20 is generated. For example, the original frame image is generated in a manner that the image of the picture in the hand drawing area Y10 is arranged as an outer frame with a background transparent image or arranged as a frame object with a background transparent image. The frame object is, namely, the picture in the hand drawing area Y10 is fixed as an object arranged in the frame.

More specifically, when the original frame image is the outer frame, which has a limited width, the original frame image is designed based on a feature amount of the image of the picture. For example, when an aspect ratio of the image of the picture is used as the feature amount and when the image of the picture is vertically long (portrait image), the image of the picture is arranged such that a frame area is vertically long. Alternatively, when the image of the picture is horizontally long (landscape image), the image of the picture is arranged such that the frame area is horizontally long. In addition, when the aspect ratio of the image of the picture, which is vertically long, is used as the feature amount and when the frame object is generated instead of the outer frame, the image of the picture is displayed as the frame object with a vertically-long layout. On the other hand, when the image of the picture is horizontally long, the image of the picture is arranged as the frame object with a horizontally-long layout. A target of the feature amount and a method of arranging the image as the frame or the frame object are not limited thereto. The image may be arranged with a different aspect ratio, or may be arranged with a different orientation. The method of arranging the image may be appropriately modified according to the feature amount of the picture. In addition, the original frame image may be further added with an advertisement and provided as a frame with the advertisement (first frame image).

In the description of the present embodiment, the original frame image is used, as a specific example, in a process related to the content.

The identification information recognition unit 111-1 performs acquisition processing (recognition processing) of acquiring the identification information in which the content generated by the content generating unit 111-2 is managed. In the present embodiment, as an example, the bar code is given in the identification area Y12 as illustrated in FIG. 3A, the identification information recognition unit 111-1 reads the bar code in the identification area Y12 from the image of the front side Y1 of the sheet, which is acquired by the image acquisition unit 114, and decodes the bar code into an identification code. The registration processing unit 111 specifies, as management information for the content, the identification information decoded and obtained by the identification information recognition unit 111-1 and predetermined shop information. The management information includes, for example, shop information (e.g., a shop code) and identification information (e.g., an identification code), and is specified as a file path or the like at a time of registering the content. Regarding the shop information (shop code), a predetermined shop code of each shop is recorded for each registration device 10 of the shop, and the shop code is read and used. The shop code corresponds to a storage location, which varies for each shop, and which is indicated by the link information of the AR mark registered in advance in the search DB 32.

The communication unit 110 controls the communication I/F 1007 to communicate with a device or the like on the network 2. The communication unit 110 mainly communicates with the content providing server 40 and requests the content providing server 40 to register the content.

The input unit 112 receives information indicating an input operation that is performed with the input device 1006. The display unit 113 generates display information to be displayed on the display 1008.

Figure 6:
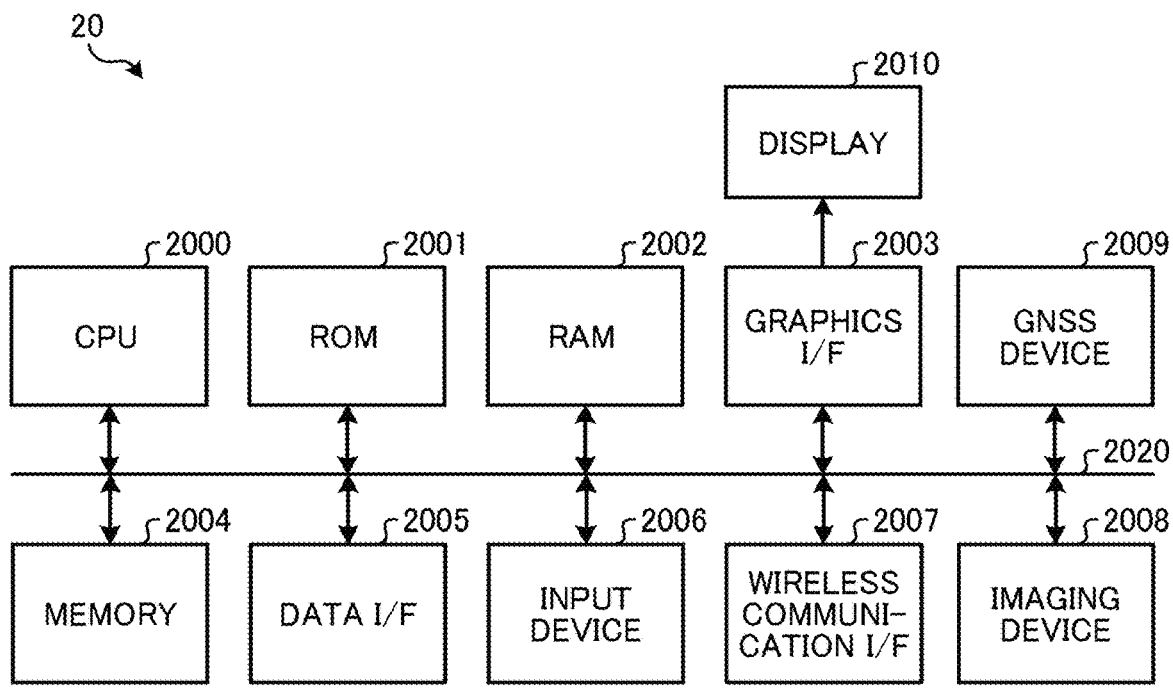
FIG. 6 is a block diagram illustrating an example of a hardware configuration of a terminal device according to an embodiment of the disclosure.

FIG. 6 is a block diagram illustrating an example of a hardware configuration of the terminal device 20. The terminal device 20 is an information processing device on which a computer including a CPU, a ROM, and a RAM are mounted. As illustrated in FIG. 6, the terminal device 20 includes, for example, a CPU 2000, a ROM 2001, a RAM 2002, and a graphics I/F (interface) 2003 that are connected to a bus 2020. In addition, the terminal device 20 includes a memory 2004, a data I/F 2005, an input device 2006, a wireless communication I/F 2007, an imaging device 2008 and a global navigation satellite system (GNSS) device 2009 that are connected to the bus 2020.

The memory 2004 is a non-volatile storage medium capable of storing data. For example, the memory 2004 is a non-volatile semiconductor memory such as a flash memory. Not limited to this, a hard disk drive may be used as the memory 2004. The memory 2004 stores programs to be executed by the CPU 2000 and various data. The memory 2004 and the ROM 2001 may be provided, for example, by sharing one rewritable nonvolatile semiconductor memory or the like.

The CPU 2000 controls the entire operation of the terminal device 20 using the RAM 2002 as a work memory according to a program stored in the ROM 2001 and the memory 2004. The graphics I/F 2003 converts display control signals generated by the CPU 2000 into signals that are displayable with the display 2010, and outputs the converted signals to the display 2010. The display 2010 includes, for example, an LCD, and displays according to the display control signal by being driven with a signal output from the graphics I/F 2003.

The data I/F 2005 performs data input/output with an external device. An interface such as a USB or Bluetooth (registered trademark) can be used as the data I/F 2005.

The input device 2006 receives an operator's input in relation to the terminal device 20. As an example, the input device 2006 is a touch panel configured with the display 2010. The touch panel receives a touch operation on an operation key or the like displayed on a screen according to the screen displayed on the display 2010, and outputs a signal of a touch position.

The wireless communication IX 2007 establishes a wireless communication via the network 2 under control of the CPU 2000. The wireless communication I/F 2007 accesses an access point or the like to connect to the network 2 such as the Internet.

The imaging device 2008 includes an optical system lens, an imaging sensor, and a control driving circuit for the optical system lens and the imaging sensor, and outputs an image obtained by performing predetermined processing on an imaging signal output from the imaging sensor in a predetermined frame period. The imaging device 2008 captures an image (video image) output in the predetermined frame period according to a shutter timing, and stores the captured image (still image) in the memory 2004, for example.

The GNSS device 2009 measures a current position using a GNSS. The GNSS device 2009 can output, as a measurement result, coordinates of the current position and a time of the measurement. The advertisement displayed on the original frame image can be changed based on the coordinates of the current position of the GNSS device 2009.

Figure 7:
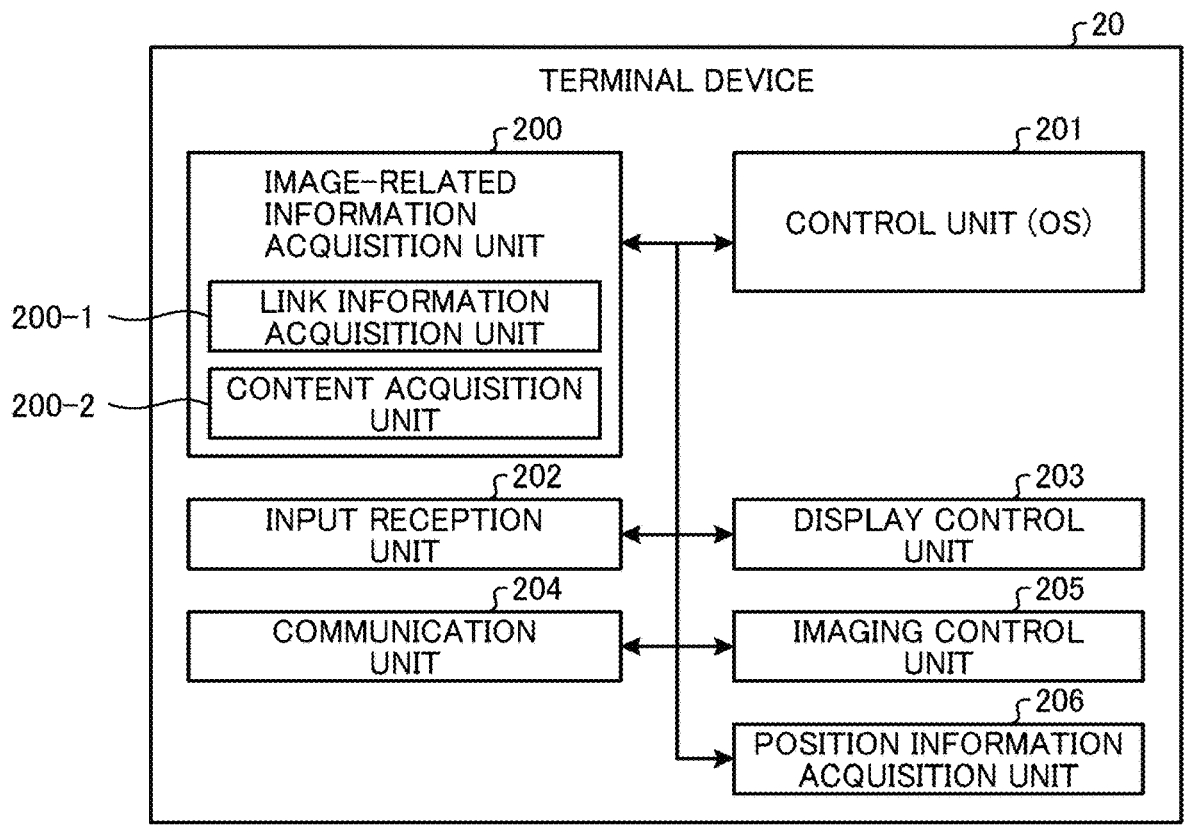
FIG. 7 is a block diagram illustrating an example of a functional configuration of a terminal device according to an embodiment of the disclosure.

FIG. 7 is a block diagram illustrating an example of a functional configuration of the terminal device 20 according to the present embodiment. The terminal device 20 includes, for example, an image-related information acquisition unit 200, a control unit (overall control unit) 201, an input reception unit 202, a display control unit 203, a communication unit 204, an imaging control unit 205, and a position information acquisition unit 206. The above-mentioned units are implemented by the CPU 2000 executing a program stored in the ROM 2001 or the memory 2004. Among the above-mentioned units, the image-related information acquisition unit 200 is mainly corresponding to a module of the dedicated application.

The image-related information acquisition unit 200 includes, a link information acquisition unit 200-1 and a content acquisition unit 200-2 to acquire the related information, which is related to the captured image output from the imaging device 2008. In addition, the image-related information acquisition unit 200 also processes the related information by launching an application (e.g., a camera application) corresponding to the acquired related information. In this description, the link information acquisition unit 200-1 functions as a "link information acquisition unit", and the content acquisition unit 200-2 functions as a "content acquisition unit". The related information is, for example, the content provided by the content providing server 40.

More specifically, the link information acquisition unit 200-1 transmits the captured image (still image) to the image search system 30, and requests to search for the link information corresponding to the captured image. Then, the link information acquisition unit 200-1 acquires the link information corresponding to the captured image from the image search system 30.

The content acquisition unit 200-2 accesses the content providing server 40 using the link information acquired by the link information acquisition unit 200-1 and the unique identification information of the user, and acquires the content as the related information from the content providing server 40. The content acquisition unit 200-2 launches the application according to the acquired content, and causes the application to perform processing on the content.

The control unit 201 is, for example, an operating system (OS). The control unit 201 controls processing of each of the image-related information acquisition unit 200, the input reception unit 202, the display control unit 203, the communication unit 204, the imaging control unit 205, the position information acquisition unit 206, and the like, as a whole.

The input reception unit 202 receives an input operation performed in relation to the input device 2006. The display control unit 203 generates a display control signal to be supplied to the graphics I/F 2003. For example, the display control unit 203 displays a predetermined screen including operation keys. The operation keys are, for example, instruction buttons (a confirmation button, a cancel button, a start button, etc.), a software keyboard for inputting text such as characters, alphanumeric characters, and symbols into an input box. When the user touches the operation key on the screen, the input reception unit 202 receives an instruction operation via the operation key.

The communication unit 204 controls communication established by the wireless communication OF 2007. The communication unit 204 controls the communication with each of the image search system 30, the content providing server 40, an application providing server, an external service providing server, an SNS server, and the like.

The imaging control unit 205 operates in conjunction with the imaging device 2008 to function as an "imaging unit", and controls imaging operation of the imaging device 2008. For example, the imaging control unit 205 starts or terminates (ends) the imaging operation of the imaging device 2008 or controls shutter timing. The position information acquisition unit 206 acquires position coordinates and a time under control of the GNSS device 2009.

The hardware configuration illustrated in FIG. 4. is applicable to each of the hardware configuration of the image search system 30 and the content providing server 40 illustrated in FIG. 1, and an illustration and a description of thereof are omitted here. However, note that each of the image search system 30 and the content providing server 40 can be configured not only by one information processing device but also a plurality of information processing devices by distributing processing to each of the plurality of information processing devices.

Registration Sequence

A description is now given of a process according to the present embodiment. In the image search system 30, it is assumed that information on the AR mark of the sheet, which is to be provided for drawing a picture in each shop, information on, for example, an advertisement of each shop printed in the AR area Y23 of the sheet Y, and a URL (path to each shop) of the content providing server 40, which is a provider of the related information are registered. The registration to the image search system 30 may be performed by using a portable recording medium, or may be performed by accessing from the registration device 10 to the image search system 30 via the network 2 and setting on a screen for the registration to the image search system 30. In the following description of the embodiment, the registration to the image search system 30 is performed in advance.

Figure 8:
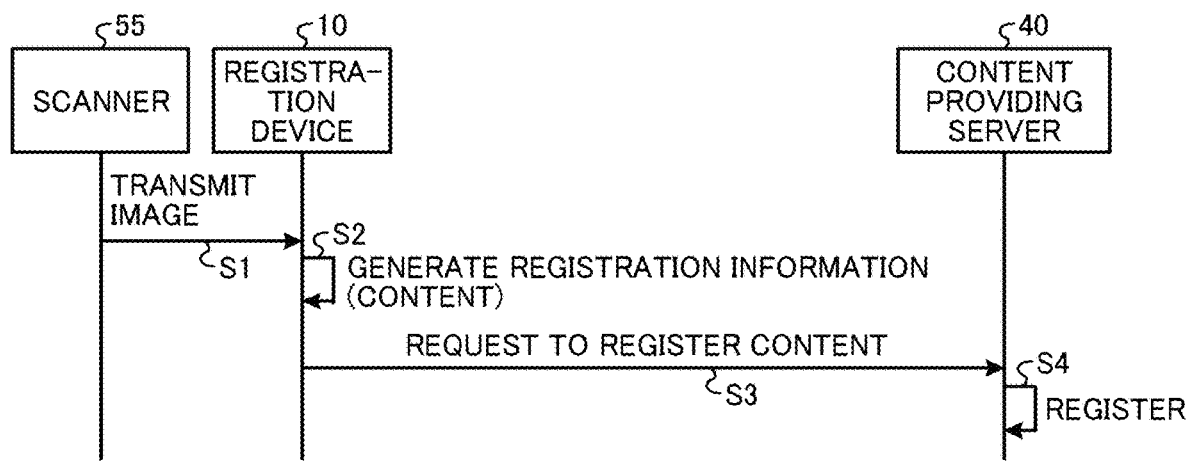
FIG. 8 is a sequence diagram illustrating an example of a process of registering content to a content providing server, according to an embodiment of the disclosure.

FIG. 8 is a sequence diagram illustrating an example of a process of registering content to the content providing server 40 by the registration device 10 of the shop, in the information processing system 1, according to the present embodiment. The sequence starts, for example, when the operator gets, from the event participant, the sheet Y on which the event participant has drawn a picture, and presses the image reading start button or the like after setting the sheet Y on the image reading apparatus (scanner) 55, in the event site.

First, the image reading apparatus (scanner) 55 outputs (transmits), to the registration device 10, an image read from the front side Y1 of the sheet Y set on the image reading apparatus (scanner) 55 (S1).

Subsequently, the registration device 10 performs content generating operation to generate the content (i.e., the original frame image) of the image of the hand drawing area Y10 included in the read image (S2).

The registration device 10 generates the management information corresponding to the content. The management information includes the predetermined shop code and the identification information (the identification code) in the identification area Y12 of the read image. The registration device 10 further requests the content providing server 40 to register the content to a location indicated by the management information (S3).

The content providing server 40 registers the content (i.e., the original frame image) for a unique path indicated by the management information, according to the request for the registration (registration request) from the registration device 10 (S4).

In the present embodiment, the read image output to the registration device 10 in Step S1 is also displayed by the image display system 50 as an image to which motion is given.

In addition, in this sequence, the read images of the sheets are output to the registration device 10 from the image reading apparatus (scanner) 55 one by one, and the registration device 10 repeats the steps for the registration (Steps S2 and S3) each time when receiving the read image of the sheet. However, a part of or all of the steps for the registration may be collectively performed on a plurality of read images at a time when a predetermined number of read images are accumulated or at predetermined time intervals.

Here in the description of the example, the operator presses the image reading start button each time when setting the sheet Y on which the picture is drawn by the event participant on the image reading apparatus (scanner) 55 to start reading the image. However, the disclosure is not limited thereto, and if including an auto document feeder (ADF), the image reading apparatus (scanner) 55 may sequentially reads images of the plurality of sheets Y, which are set in response to a user operation of pressing the button once.

Acquisition Sequence

Figure 9:
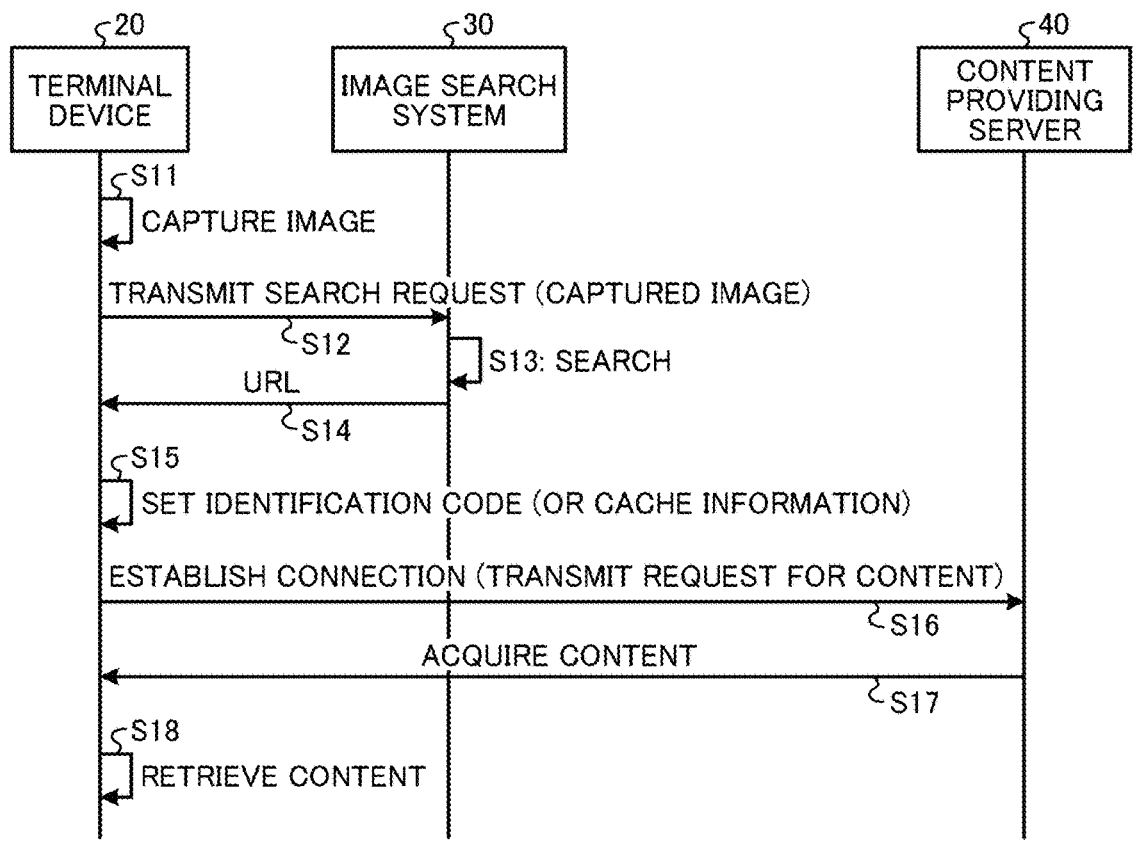
FIG. 9 is a sequence diagram illustrating an example of a process in which a terminal device acquires content of an application from a content providing server according to an embodiment of the disclosure.

FIG. 9 is a sequence diagram illustrating an example of a process in which the terminal device 20 acquires the content for the application from the content providing server 40 in the information processing system 1, according to the present embodiment. First, the terminal device 20 captures an image of the AR area Y23 by the camera function (S11). That is, in this example, the user captures the image of the AR area Y23 on the back side Y2 of the sheet Y, which is used by the user to draw a picture on the front side Y1, by using the terminal device 20 in order to obtain an original frame image of the picture drawn by the user.

The terminal device 20 transmits the captured image (still image) of the AR area Y23 to the image search system 30, by a function of acquiring the image-related information, to request to search (retrieve) the image (S12). Namely, the terminal device 20 transmits a search request to the image search system 30.

In response to the search request received from the terminal device 20, the image search system 30 searches the search DB 32 based on the information obtained from the captured image (still image) of the AR area Y23 (S13). Then, the image search system 30 extracts the link information (URL) corresponding to the captured image (still image) of the AR area Y23 and transmits the extracted link information to the terminal device 20, which is a request source (S14).

In response to the link information (URL) received from the image search system 30, the terminal device 20 sets, to the URL, a file path to the content (i.e., the original frame image) (S15) of the user. The file path is set using the identification information input by the user of the terminal device 20. In addition, the terminal device 20 displays an input screen for receiving a user input of the identification information when the user uses the application of the terminal device 20 for the first time. From the second time use, the identification information received from the user at the first time use is automatically read from a cache and set. In this example, the user reads the identification code, which is a human-readable code printed in the identification area Y23 on the back side Y2 of the sheet Y, and inputs the identification code.

The terminal device 20 establishes a connection (connects) to the content providing server 40 to request for the content (i.e., the original frame image) corresponding to the set file path (S16).

The content providing server 40 extracts the content (i.e., the original frame image), which is requested, and transmits the content to a request source (i.e., the terminal device 20) (S17).

The terminal device 20 reads (retrieves) the content (i.e., the original frame image of the picture drawn by the user in the event site) acquired from the content providing server 40 and displays the content such that the content is combined with (superimposed on) the video image output from the imaging device 2008 (S18).

Operation Flow of Terminal Device

Figure 10:
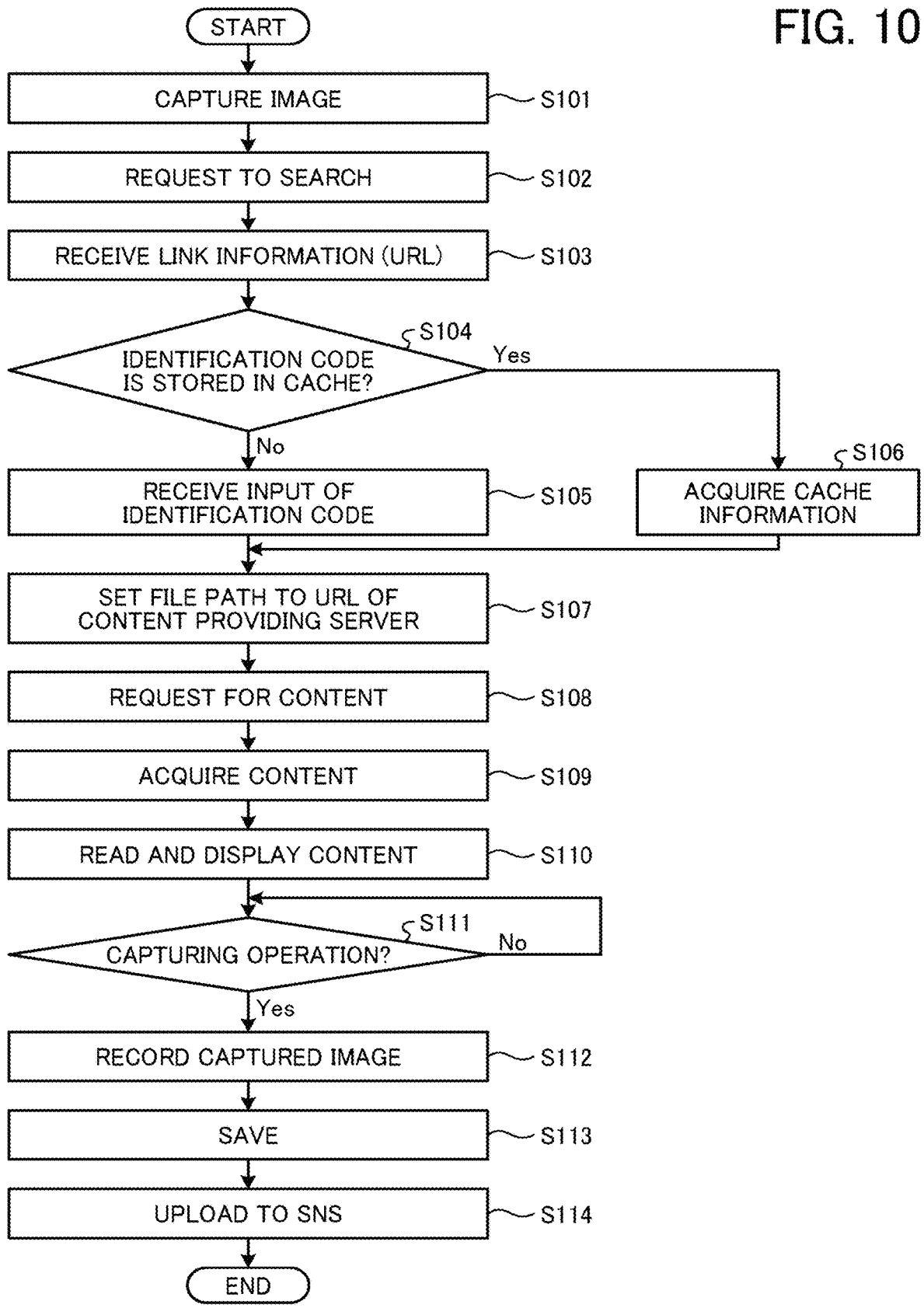
FIG. 10 is a flowchart illustrating an example of a process of reading content (content reading processing) performed by a terminal device according to an embodiment of the disclosure.

FIG. 10 is a flowchart illustrating an example of a process of reading content (content reading processing) performed by the terminal device 20 according to the present embodiment. First, the image-related information acquisition unit 200 captures an image of the AR area Y23 by the camera function (S101).

Subsequently, the image-related information acquisition unit 200 transmits the captured image (still image) of the AR area Y23 to the image search system 30 by the link information acquisition unit 200-1 to request to search the link information (e.g., a shop URL) corresponding to the captured image (still image) of the AR area Y23 (S102).

Subsequently, the image-related information acquisition unit 200 receives, from the image search system 30, the link information (e.g., a shop URL) corresponding to the captured image (still image) of the AR area Y23 (S103).

Subsequently, the image-related information acquisition unit 200 determines whether the identification information is stored in the cache (S104). If the identification information is not stored in the cache (S104: No), the input screen (management information input screen 610 (see FIG. 12)) for receiving the user input of the identification information is displayed, and the user input of the identification information is received (S105). At the first time use after the activation, since the cache does not have the identification information, the input screen is displayed to instruct the user to input the identification information. Then, the image-related information acquisition unit 200 acquires the input identification information and performs the subsequent processing of Step S107. The identification information remains in the cache after the first time use and is in the cache from the second time use after the activation. Accordingly, from the second time use, the image-related information acquisition unit 200 determines that the identification information is stored in the cache (S104: Yes), acquires the identification information from the cache (S106), and continues the subsequent process including the processing of Step S107. Therefore, the input screen does not have to be displayed from the second time use after the activation.

When acquiring the identification information, the image-related information acquisition unit 200 sets the identification information (file path) to the URL (including the path for each shop) to be accessed (S107).

Subsequently, the image-related information acquisition unit 200 requests the content providing server 40 for the content (i.e., the original frame image) (S108), and acquires the content (i.e., the original frame image) from the content providing server 40 (S109).

Subsequently, the image-related information acquisition unit 200 reads the content (i.e., the original frame image of the picture drawn by the user in the event site) acquired from the content providing server 40 by using the camera application, and displays the original frame image such that the original frame image is combined with (superimposed on) the video image output from the imaging device 2008 (S110).

Subsequently, the image-related information acquisition unit 200 determines whether the user performs a capturing operation or not (S111). If the capturing operation is performed (S111: Yes), a captured image is recorded such that the image (captured image) includes the original frame image (S112). After the capturing operation, the image-related information acquisition unit 200 stores the captured image in a flash memory according to a user operation of saving the image (S113). If the capturing operation is an operation including starting and stopping for capturing a video image, the video image is recorded. Alternatively, if the capturing operation is a shutter operation for capturing a still image, the still image captured at a shutter timing is recorded.

Subsequently, the image-related information acquisition unit 200 displays, for example, a share screen to receive a selection of a destination of an SNS to share the captured image and uploads the captured image to the selected SNS (S114).

Screens

Figure 11:
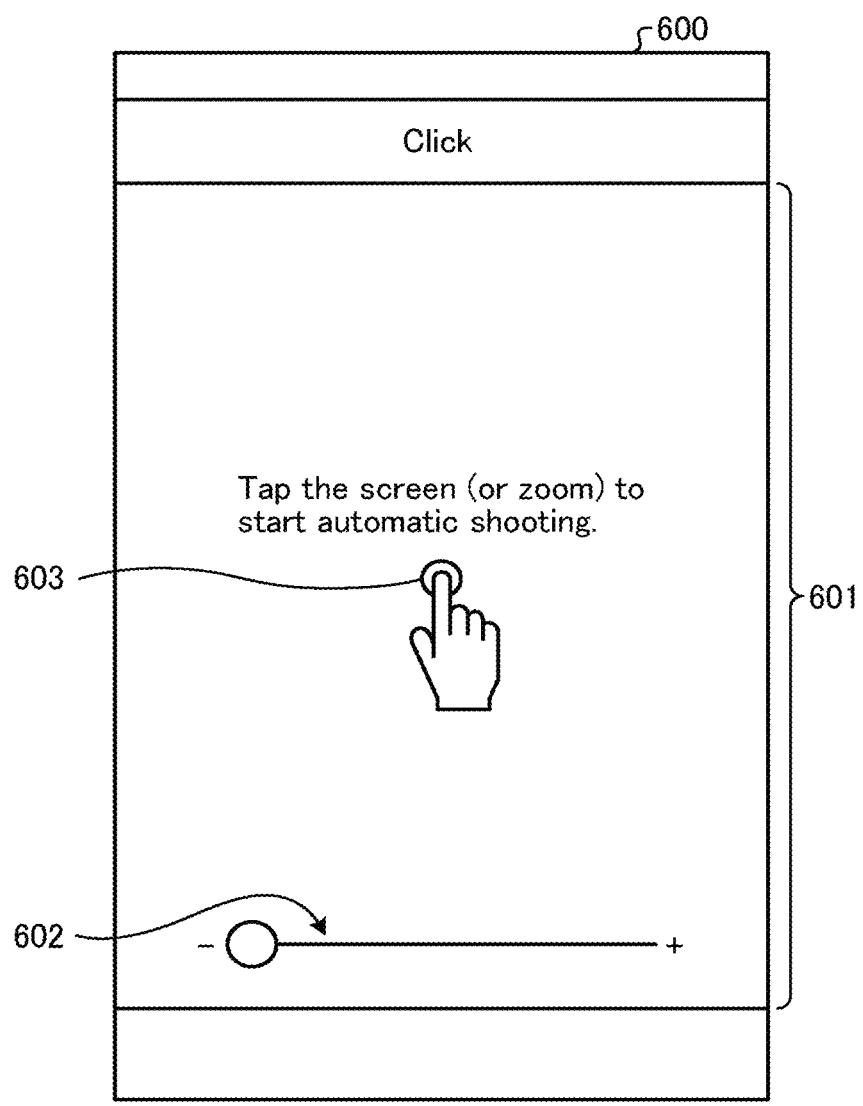
FIG. 11 is an illustration of a screen displayed when a dedicated application is activated in a terminal device according to an embodiment of the disclosure.

FIG. 11 to FIG. 15 are illustrations of a series of screens in the content reading processing performed by the terminal device 20, according to the present embodiment. FIG. 11 is an illustration of a screen displayed when the dedicated application is activated in the terminal device 20. When the dedicated application is activated, a screen 600 is displayed, and an image output from the imaging device 2008 is displayed as a video image in a display area 601. The user can operate a scroll 602 for zoom-out in the display area 601 to enlarge or reduce a size of a subject being displayed in the display area 601.

In the example of FIG. 11, the icon 603 that is a start button for capturing an image is displayed at the center of the display area 601. The user adjusts the camera of the terminal device 20 in a manner that the AR area Y23 of the sheet Y is displayed in the display area 601, and touches (taps) the icon 603, which is the start button. Then, a still image corresponding to the AR area Y23 is transmitted to the image search system 30, and the link information of the AR mark can be received from the image search system 30.

Figure 12:
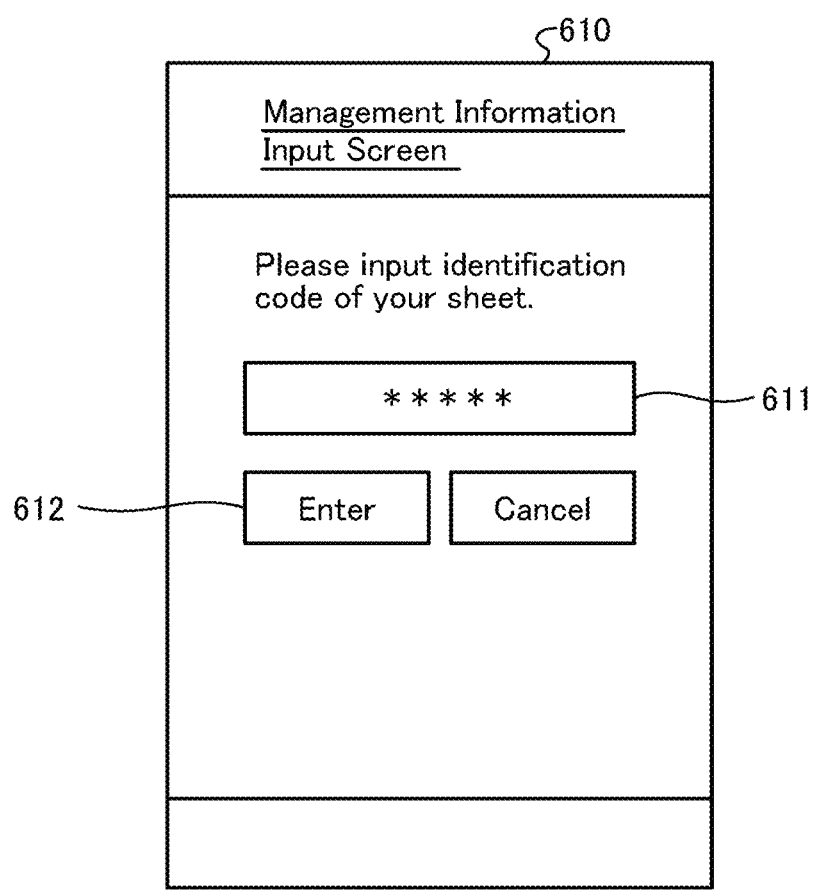
FIG. 12 is an illustration of an input screen (management information input screen) displayed after a touch operation performed on an icon, which is a start button, according to an embodiment of the disclosure.

FIG. 12 is an illustration of an input screen (i.e., a management information input screen) displayed after the touch operation performed on the icon 603, which is the start button. The input screen 610 illustrated in FIG. 12 is displayed at the time of the first use after the activation, for receiving the user input of the unique identification information indicating an acquisition destination (information acquisition destination) of the content related to the user. Since the cache information is used from the second time use, the display of the input screen 610 may be set to be skipped after the first time use.

The input screen 610 includes an information input box 611. The identification information is input and displayed in the information input box 611 according to a user operation performed by using, for example, a software keyboard. The user inputs a human readable identification code, which is printed on the identification area Y22 of the back side Y2 of the sheet Y. Then, when an enter button 612 on the input screen 610 is pressed, the identification information is entered. The terminal device 20 acquires the identification information entered by pressing the enter button 612, sets a file path to the URL, and requests the content providing server 40 to acquire (transmit) the content.

If the identification information input on the input screen 610 is not a predetermined code, or if there is no corresponding file path in the content providing server 40, the terminal device 20 may display the input screen 610 again or an error screen.

Figure 13:
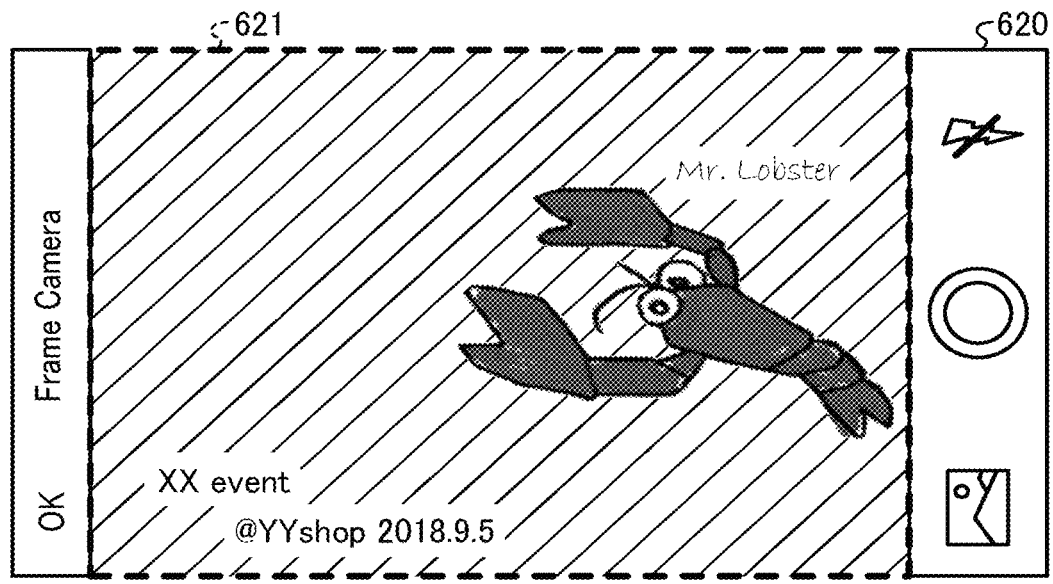
FIG. 13 is an illustration of a screen displayed when an original frame image is acquired from a content providing server, according to an embodiment of the disclosure.

FIG. 13 is an illustration of a screen displayed when an original frame image of the picture drawn by the user is acquired from the content providing server 40 according to the present embodiment. FIG. 13 illustrates a screen 620 in a state where the terminal device 20 is turned 90 degrees sideways. On the screen 620, an original frame image 621 is displayed, and a video image output from the imaging device 2008 is displayed in a transparent area (the area indicated by oblique lines in the original frame image 621).

Figure 14:
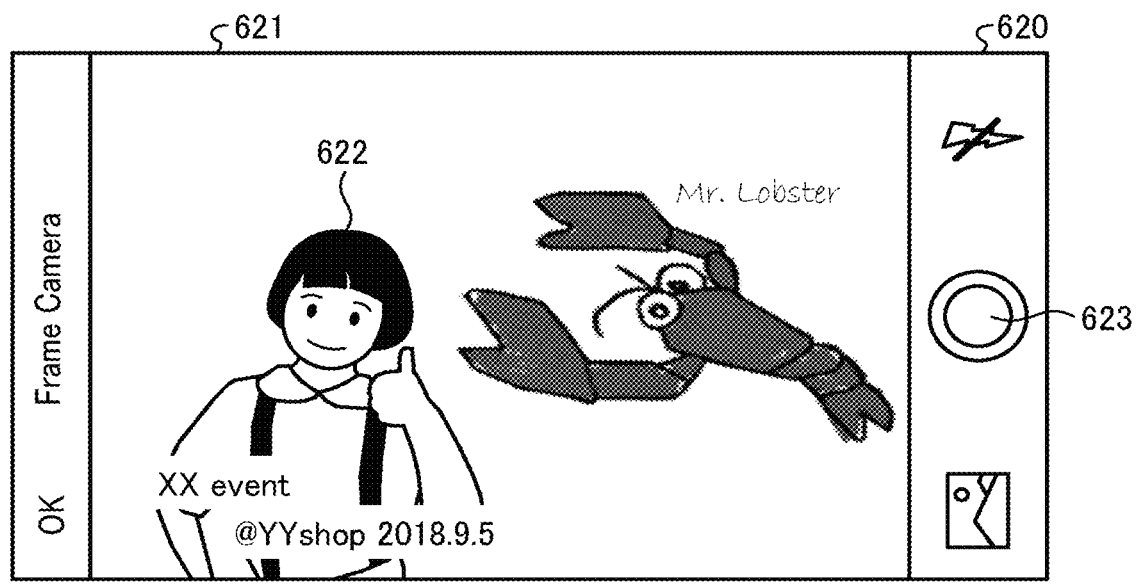
FIG. 14 is an illustration of a screen displayed when a capturing operation is performed with an original frame image, according to an embodiment of the disclosure.

FIG. 14 is an illustration of a screen displayed when a capturing operation is performed with the original frame image 621, according to the present embodiment. When the camera of the terminal device 20 is directed to a subject (for example, a person), a subject 622 is caught by the imaging device 2008 in the transparent area in the original frame image 621 on the screen 620 as illustrated in FIG. 14. In this state, a video image or a still image including the original frame image 621 is captured by pressing a capture button 623.

Then, the captured video image or the captured still image is stored such that the image is combined with the original frame image 621 in response to a user operation for saving.

Figure 15:
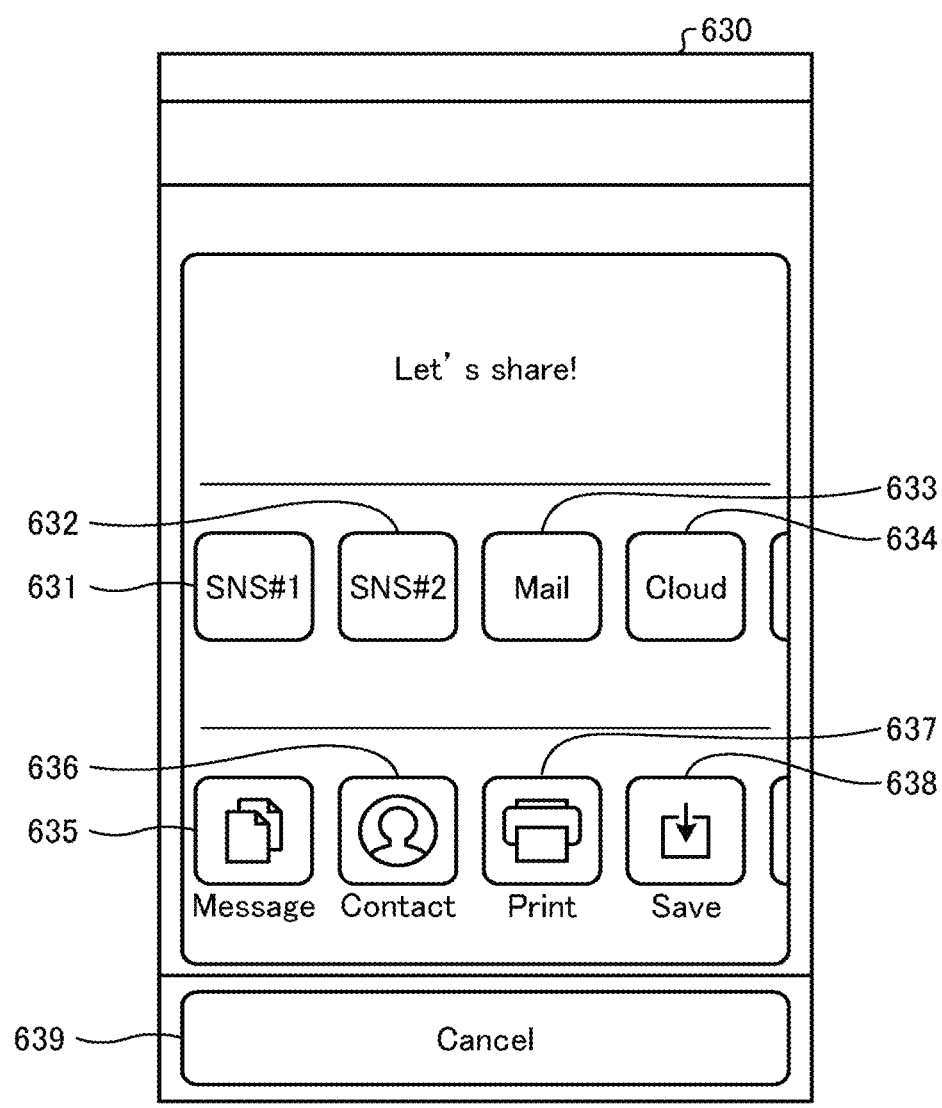
FIG. 15 is an illustration of a selection screen for receiving a selection of a social networking service (SNS) for sharing a captured image, according to an embodiment of the disclosure.

FIG. 15 is an illustration of a selection screen for receiving a selection of an SNS for sharing a captured image, according to the present embodiment. On a selection screen 630 illustrated in FIG. 15, a plurality of selection buttons (icons) for a destination to share the captured image are displayed. In the example of FIG. 15, icons of first SNS (SNS #1) 631, second SNS (SNS #2) 632, Mail 633, and Cloud 634 are illustrated. In addition, the other selection buttons (icons) of message 635, contact 636, print 678, and Save 638 are also provided. The captured image is transmitted to a target destination indicated by one of the buttons, when the corresponding button is pressed. A cancel button 639 is a button for closing the selection screen 630.

In the present embodiment described above, the input screen for receiving the user input of the identification information is displayed when the terminal device 20 receives the link information, but the present disclosure is not limited thereto. For example, when the terminal device 20 accesses the content providing server 40, information on an input screen may be received from the content providing server 40, and the user input of the identification code may be received via the input screen corresponding to the information received.

Moreover, the method of acquiring the identification information in the terminal device 20 is not limited to the input via the input screen. For example, the identification area Y23 (AR area Y23) may be captured by the terminal device 20, and then, the acquired image corresponding to the identification area Y23 (AR area Y23) may be decoded to acquire the identification information.

According to the present embodiment described above, it is possible to provide a service with which the user enjoys the image of the picture created in the event site as the content for the application even outside the limited area, such as the event site. Therefore, even at home after the event, the user can play with (use) the image of the picture drawn by the user or his or her child in the event site again by using the application of a terminal device. In addition, it is also possible for the user to enjoy, in the event site, the image of the picture, which is drawn in the event site, by using the application of the terminal device.

First Modification

In the present embodiment described above, the registration device 10 generates the original frame image based on the image of the picture drawn by the user in the event site, however, the disclosure is not limited thereto, and motion may be given to the image of the picture (second frame image). For example, a feature amount such as an aspect ratio is extracted from the image of the picture, and predetermined motion is given to the image of the picture based on the feature amount.

Figure 16:
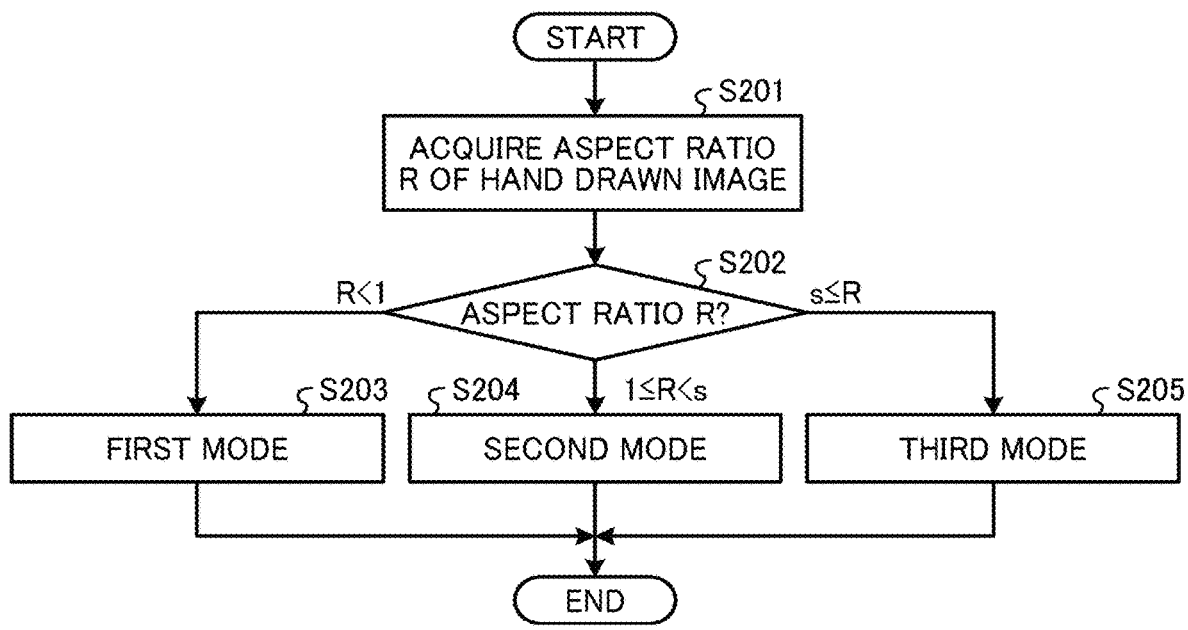
FIG. 16 is a flowchart illustrating an example of a process of generating content (content generation processing) performed by a registration device according to a first modification of an embodiment of the disclosure.
Figure 17:
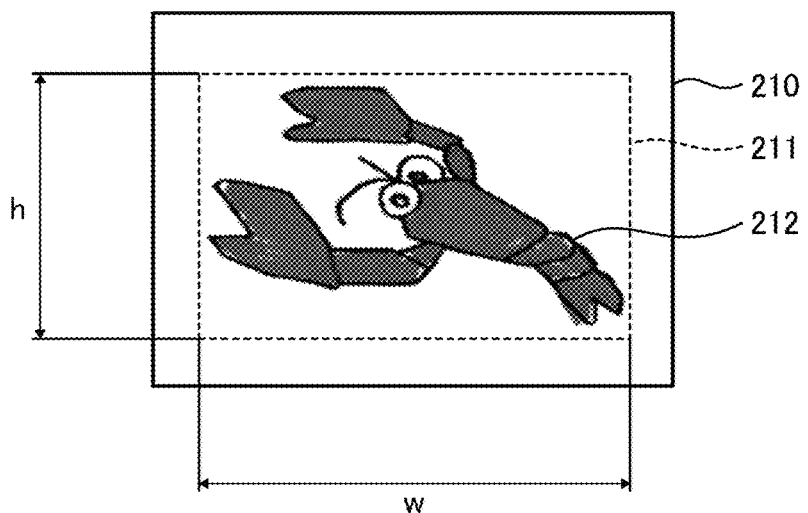
FIG. 17 is a diagram for describing about detection of a boundary between an image of a hand drawing area and a background image, according to an embodiment of the disclosure.
Figure 18:
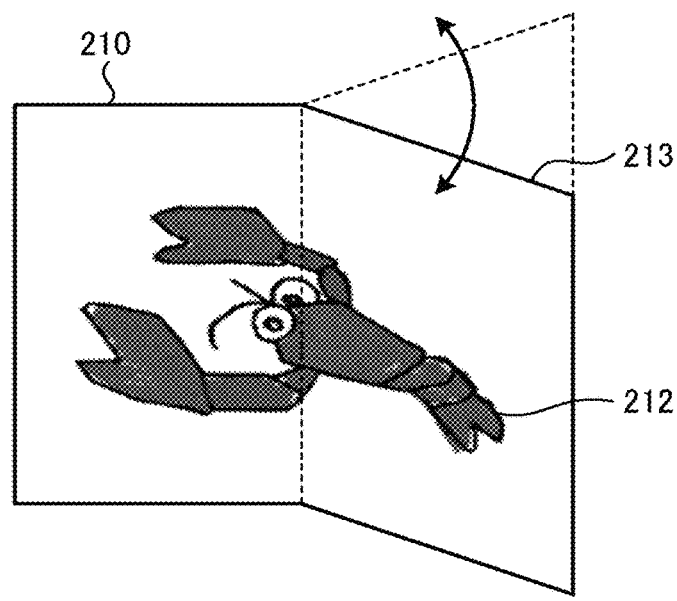
FIG. 18 is a diagram for describing a process of giving (applying) motion in a third mode, according to an embodiment of the disclosure.

FIG. 16 to FIG. 18 are diagrams for describing a process of generating content (content generation processing) performed by the registration device 10 according to the first modification.

FIG. 16 is a flowchart illustrating an example of the content generation processing performed by the registration device 10. First, the registration device 10 extracts an image of the hand drawing area Y10 from the read image of the front side Y1, and acquires an aspect ratio of the image of the picture drawn by hand (hand drawn image, manually-drawn image) (S201). For example, as illustrated in FIG. 17, a boundary 211 between a hand drawn image 212 in a vertical direction h and a horizontal direction w and its background image is detected in an image 210 of the hand drawing area Y10, and the aspect ratio (R=h/w) of the hand drawn image 212 is calculated and acquired.

Subsequently, the registration device 10 determines classification of the hand drawn image 212 based on the aspect ratio R (S202). When R<1, the hand drawn image 212 is determined to be vertically long. In this case, for example, the hand drawn image 212 is vertically divided into two (an upper part and a lower part), and the predetermined motion is given to the lower part (S203: first mode). In a case of s>R≥1 ("s" is a threshold previously set, for example, according to the empirical rule or to the user preference), for example, motion for extending in the vertical direction is given to the hand drawn image 212 (S204: second mode). When R≤s, the hand drawn image 212 is determined to be horizontally long. In this case, for example, the hand drawn image 212 is horizontally divided into two (a right part and a left part), and motion is given to the right part (S205: third mode).

FIG. 18 is a diagram for describing a process of giving (applying) motion in the third mode, according to the present embodiment. As illustrated in FIG. 18, for example, the image 210 is divided into parts of right and left, and only a right part 213 is moved as indicated by an arrow such that the hand drawn image 212 is displayed having the motion in plural states (at least two states) that are repeated. In addition, the background area other than the hand drawn image 212 in the image 210 is preferably set as the transparent area.

Note that the method for causing the picture of the image to have the predetermined motion is not limited thereto. For example, each part of the picture may be extracted based on color or outline of the image, and the predetermined motion may be given to each part based on the feature amount indicating the aspect ratio, a positional relationship, or the like of each part.

By registering, to the content providing server 40, the content of the picture of the image to which the motion is set with the terminal device 20 as described above, the content acquired by the terminal device 20 can be caused to have the motion.

Second Modification

In the present embodiment described above, an example of providing the original frame image, which is the content of the picture drawn in the event site is described, however the disclosure is not limited thereto. For example, another type of content may be further generated to be provided, or an article (e.g., shop information or promotion information) about an event on a website of the shop may be provided. In this case, a plurality of link destinations are displayed on the terminal device 20, and any one of the plurality of link destinations is to be selected.

For example, as the content other than the original frame image, a slot image to be used with a slot application is generated. The slot application is a game application that provides a game to align three images from a large number of slot images used in the game such that the three images are the same images, for example. The registration device 10 generates one or more slot images from the image of the picture drawn by the user in the event site and registers the one or more slot images to the content providing server 40. The slot image may be registered to the content providing server 40 with the same URL as the original frame image with a different path, or may be registered in the content providing server 40 with a URL different from that of the original frame image.

In addition, in the image display system 50, a video image, which is the image of the picture drawn by the user in the event site and displayed with the motion given to the picture, is recorded by the registration device 10, and the video image is registered from the registration device 10 to the content providing server 40 as the content.

In the image search system 30, the URL indicating the link destination of the content (original frame image, slot image, etc.) and the URL indicating the link destination of the web information are set in advance, as a plurality pieces of link information corresponding to the AR mark of the AR area Y23. When the terminal device 20 captures the image of the AR area Y23, the plurality of pieces of link information are transmitted from the image search system 30, and a selection screen for receiving a user input of selecting one of the link destinations is displayed on the terminal device 20.

Figure 19:
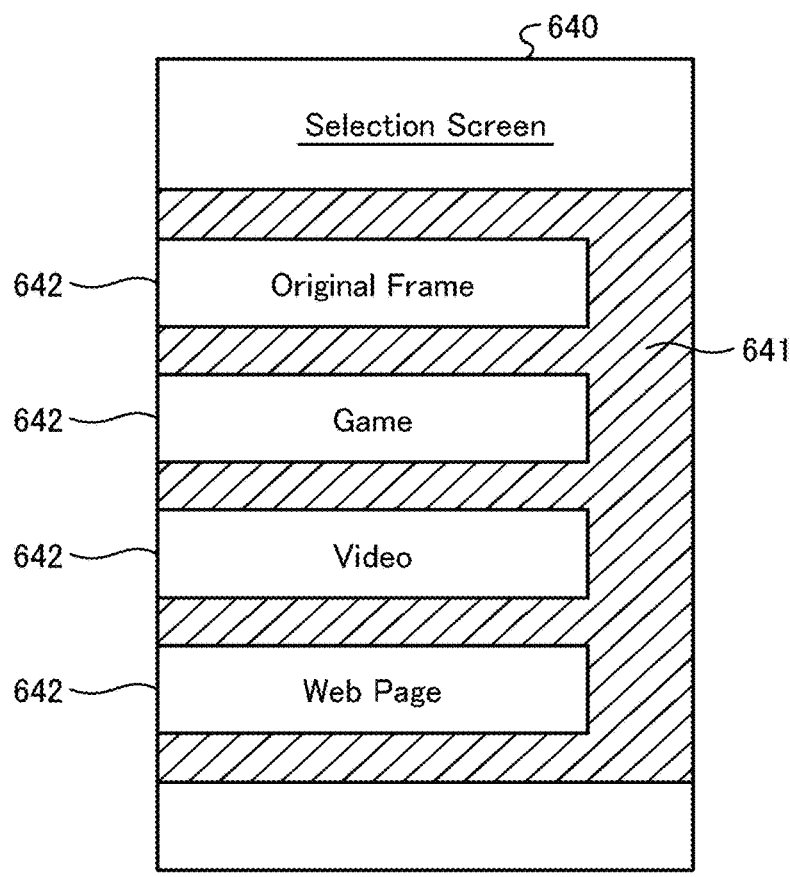
FIG. 19 is an illustration of a selection screen for selecting a link destination, according to a second modification of an embodiment of the disclosure.

FIG. 19 is an illustration of the selection screen for selecting a link destination, according to the second modification. A selection screen 640 illustrated in FIG. 19 is a screen displayed after the icon 603, which is the start button, is touched, or tapped (pressed). A background area 641 of the selection screen 640 can be appropriately set, for example, an image (still image) or the like captured when the icon 603 is touched is set. The selection screen 640 displays icon buttons 642 each of which is selectable and corresponding to a link destination transmitted from the image search system 30. For example, a title associated with the link information in the image search system 30 is set for each icon button 642 in advance, and the title can be acquired from the link information and displayed from the link information.

The icon buttons 642, which are displayed on the selection screen 640 based on the link information, allows the user, by a touching operation to one of the icon buttons 642, to select one of the plurality of pieces of link information, when there are the plurality of the link information. When one of the icon buttons 642 is selected, information (e.g., the content or the web information) is read from the URL associated with the selected icon button 642. In a case of acquiring the content, as in the embodiment, the identification information is to be received on the input screen at a time of the first use.

Third Modification

In the embodiment described above, the registration device 10 generates the content, however, the disclosure is not limited thereto and the content providing server 40 may generate the content. In this case, the registration device 10 transmits, to the content providing server 40, an original image for generating the content and the management information corresponding to the original image. A process of generating the content and a registration process performed by the content providing server 40 are substantially the same as that performed by the registration device 10 described in the embodiment described above, expect for a device that performs the processes is changed from the registration device 10 to the content providing server 40. Therefore, further detailed description is omitted here.

Fourth Modification

In a fourth modification, pictures each of which is drawn on a different sheet by each member of a family can be provided together as the content.

For example, the operator collectively receives the sheets from the family, performs a predetermined input operation on the image reading apparatus (scanner) 55, and causes the image reading apparatus 55 to continuously read images on the sheets received from the family. The predetermined input operation may be appropriately designed. For example, the predetermined input operation may be to press a predetermined button of the image reading apparatus 55 for a long time, to press the predetermined button repeatedly and sequentially with a predetermined pattern, or to press a button provided to be dedicated to the predetermined input operation. The image reading apparatus (scanner) 55 outputs a predetermined signal to the registration device 10 in response to the predetermined input operation.

In the registration device 10, the registration processing unit 111 includes a reception unit. The reception unit detects the predetermined signal output from the image reading apparatus (scanner) 55 in order to receive an input of the read images (image group) of the family. Then, the registration device 10 waits for completion of the input of the read images (image group) of the family according to the input of the predetermined signal.

When receiving the input of the predetermined signal, the registration device 10 processes the read images input from the image reading apparatus (scanner) 55 as the read images of the family. For example, each time when the predetermined signal is input, the read images input sequentially after the predetermined signal are associated with each other and generated as the content that is to be shared by the members of the family. As another example, the registration device 10 may count (measure) a certain elapsed time after the predetermined signal is input, and the read images sequentially input during the certain elapsed time may be associated with each other and generated as the content that is to be shared by the members of the family.

When the content that is to be shared by the members of the family is the original frame image, the original frame image is generated such that the pictures drawn by the members of the family are combined together by arranging each of the pictures in a predetermined place. In addition, the registration device 10 designates a registration destination (file path) with the unique management information (management information unique to the family) including the identification information read from each read image and the shop information, and the content (i.e., the original frame image) is registered to the content providing server 40. Hereinafter, this content is also referred to as family content.

In addition, when generating the family content (i.e., the original frame image), the registration device 10 may also generate content (original frame image) for each member of the family and register the content for each member of the family to the content providing server 40. The method of generating and registering the content (original frame image) for each member of the family is the same as that described in the embodiment above, and thus the description thereof is omitted.

When one of the members of the family is to acquire the content (original frame image) by using the terminal device 20, the input screen 610 (see FIG. 12) for the identification information is displayed on the terminal device 20, and when the identification code for a personal one (personal identification code) corresponding to the one of the members of the family is input on the screen, the original frame image corresponding to the picture drawn by the one of the members of the family (not the family content, but the content for individual) is acquired. When one of the members of the family is to acquire the family content (original frame image) including the pictures drawn by each of the members of the family, a plurality of information input boxes 611, which are described later, are provided in (added to) the input screen 610, for example. When the personal identification code and the identification code corresponding to the family are input to the plurality of information input boxes 611 and entered, information indicating the file path to the family content (original frame image) is transmitted to the content providing server 40 and the family content (original frame image) can be acquired by the terminal device 20.

Figure 20:
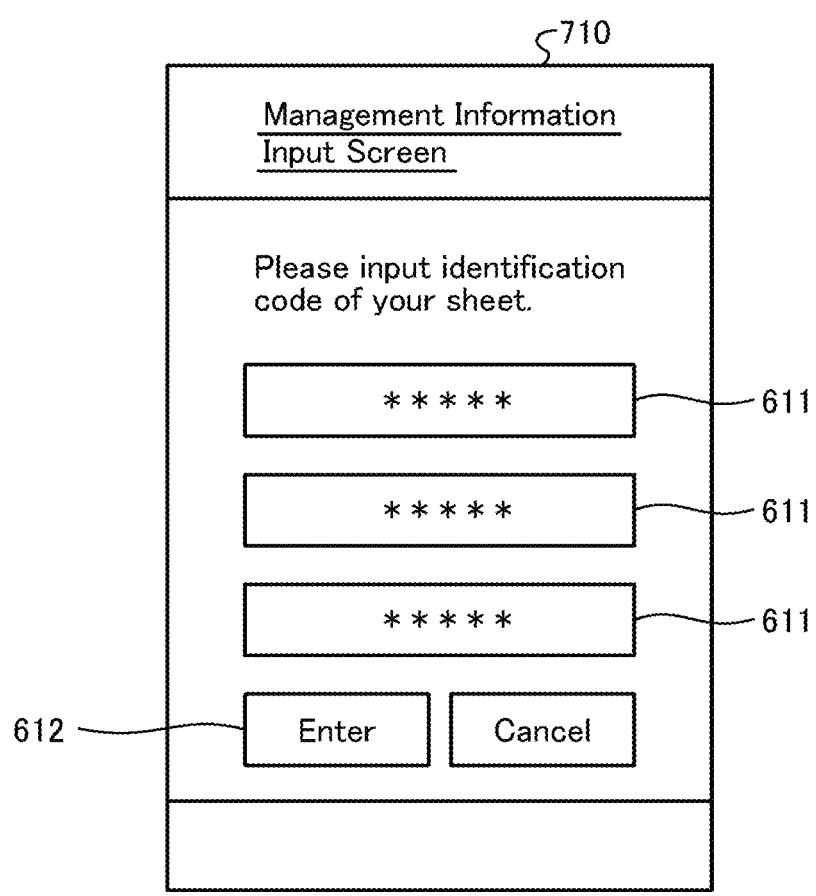
FIG. 20 is an illustration of an input screen (management information input screen) according to a fourth modification of an embodiment of the disclosure.

FIG. 20 is an illustration of an input screen (management information input screen) according to the fourth modification. The input screen 710 illustrated in FIG. 20 includes the plurality of information input boxes 611, some of which are not included in the input screen 610 illustrated in FIG. 12. When two or more of the plurality of information input boxes 611 are input with the identification information, a file path of a combination of the identification information, which are input, is generated.

A family button may be separately provided on the input screen 610, and when the family button is pressed, an input screen for receiving an input of the identification information corresponding to the family may be displayed.

In addition, the following is a configuration in a case in which the content providing server 40 generates the content, instead of the registration device 10. For example, the identification codes for the user (personal) and the family are input and entered in the plurality of information input boxes 611 of the input screen 710 (see FIG. 20). The terminal device 20 transmits the entered information to the content providing server 40 as a search key. When receiving the search key, the content providing server 40 extracts the original image corresponding to each identification code from the database, and generates the family content (original frame image) in the same manner as the registration device 10 does in the embodiment described above. Then, the family content (original frame image) is transmitted from the content providing server 40 to the terminal device 20.

An information processing program to implement each function of the registration device 10 or the terminal device 20 according to the embodiment or each modification may be stored in a computer-readable recording medium such as a compact disk (CD), a flexible disk (FD), and a digital versatile disc (DVD), in a file format installable or executable. Additionally, or alternatively, the information processing program to implement each function of the registration device 10 or the terminal device 20 according to the embodiment or each modification may be stored on a computer connected to a network, such as the Internet, and provided so that a user can download the program via the network. Additionally or alternatively, such an information processing program may be provided or distributed via a communication network such as the internet.

Note that the above-described embodiments and modifications are examples of embodiments of the claimed invention, and the embodiments of the claimed invention are not limited to the above-described embodiments and modifications. The above-described embodiments can be variously modified within the scope of the claimed invention.

Conventionally, some of event participants who participate in an event desires to enjoy an image of a picture created in an event site after the event is over. The event participant who actually creates a painting, or a picture, in the event site is mainly a kid (child), and some parents desires to use the image of the picture drawn in the event site by their child at home as well. With a known system that reads the picture drawn by the event participant in the event site as image data, it is difficult to use the image of an original source (original picture), such as the picture, again, because the system is a tool to be used by a user, namely the event participant, to enjoy in a limited area, such as the event site.

According to one of the embodiments described above, it is possible for a user to use a source picture (original picture) such as a picture, which is used in a limited area such as an event site, again.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The illustrated apparatuses are only illustrative of one of several computing environments for implementing the embodiments disclosed herein. For example, in some embodiments, the image search system and the content providing server each include a plurality of computing devices, e.g., a server cluster, that are configured to communicate with each other over any type of communications link, including a network, a shared memory, etc. to collectively perform the processes disclosed herein. Similarly, the registration device can include a plurality of computing devices that are configured to communicate with each other.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

The invention claimed is:

1. An information processing device, comprising:
circuitry configured to
receive, from an external device, image data of an original image drawn on a medium, and generate content based on the receive image data, the content being available for use by a terminal device,
acquire identification information uniquely identifying the original image; and
transmit, to a content server, a request to register the generated content and the acquired identification information in association with each other, in a location determined based on the acquired identification information, wherein the terminal device is configured to acquire the content from the content server based on the identification information.

2. The information processing device according to claim 1,
wherein the image data of the original image is image data of one of a plurality of original images, each of which is drawn on a corresponding one of a plurality of media,
wherein the circuitry is further configured to acquire the identification information that uniquely identifies the content, and transmit the request to register the content and the acquired identification information uniquely identifying the content in association with each other, in the determined location, from which the terminal device is to acquire information based on the identification information uniquely identifying the content.

3. The information processing device according to claim 1,
wherein the identification information acquired by the circuitry is recorded on the medium.

4. The information processing device according to claim 3,
wherein the identification information acquired by the circuitry is recorded on the medium as information including any one of a marker, a two-dimensional code, and a color code.

5. The information processing device according to claim 1,
wherein the medium is a sheet on which a sketch to be colored is printed,
wherein the original image is a picture drawn on the sheet, and
wherein the circuitry is further configured to generate, as the content, a frame image including the sketch that is colored.

6. The information processing device according to claim 5,
wherein the circuitry is further configured to generate, as the frame image, an outer frame based on a feature amount of the picture.

7. The information processing device according to claim 5,
wherein the circuitry is further configured to generate the frame image with a layout that is based on a feature amount of the picture.

8. The information processing device according to claim 7,
wherein the circuitry is further configured to generate the frame image, which is one of a first frame image that includes an advertisement and a second frame image in which the picture has motion.

9. An information processing system, comprising:
a registration device; and
a content server,
the registration device including first circuitry configured to
receive from an external device, image data of an original image drawn on a medium, and generate content based on the received image data, the content being available for use with a terminal device,
acquire identification information uniquely identifying the original image, and
transmit, to the content server, a request to register the generated content and the acquired identification information, in association with each other,
the content server including second circuitry configured to
store, in a memory, the generated content and the acquired identification information in association with each other, in response to the request to register received from the registration device, and
transmit, to the terminal device, the generated content stored in the memory in association with the acquired identification information, in response to receiving, from the terminal device, a request for the content, the request including the identification information.

10. An information processing system, comprising:
an image reading apparatus configured to read image data of a medium on which an original image displayable with an image display system is drawn;
a registration device communicably connected to the image reading apparatus; and
a terminal device,
the registration device being configured to
generate content available for use with the terminal device based on the image data read by the image reading apparatus,
acquire identification information uniquely identifying the original image; and
transmit a request to register the content and the identification information, in association with each other,
the terminal device being configured to
capture an identifying image of a particular area of the medium,
acquire particular link information corresponding to the captured identifying image,
input particular identification information, and
acquire the generated content registered by the registration device, from an information acquisition destination identified by an address determined by a combination of the acquired particular link information and the input particular identification information.

11. The information processing system of claim 10, wherein the terminal is configured to acquire the link information from an image search system that stores link information in association with identifying image data.

12. The information processing system of claim 10, wherein the terminal is configured to capture the identifying image of the particular area, which is on a predetermined side of the medium.

13. The information processing system of claim 1, wherein the circuitry is further configured to generate management information based on the acquired identification information, and
wherein the transmitted request requests the information acquisition destination to register the generated content to the determined location, which is a unique path name indicated by the management information.

* * * * *